(12) United States Patent
Oda

(10) Patent No.: US 8,509,572 B2
(45) Date of Patent: Aug. 13, 2013

(54) HANDWRITING RECOGNITION USING AN ELECTRONIC STYLUS

(75) Inventor: Hideto Oda, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 88 days.

(21) Appl. No.: 13/117,823

(22) Filed: May 27, 2011

(65) Prior Publication Data

US 2012/0113460 A1    May 10, 2012

(30) Foreign Application Priority Data

Nov. 8, 2010 (JP) ................. 2010-249648

(51) Int. Cl.
*G06K 9/00* (2006.01)
*G06K 9/22* (2006.01)

(52) U.S. Cl.
USPC .......................................... 382/314; 382/188

(58) Field of Classification Search
USPC ......... 358/1.14, 1.15, 424; 364/139; 369/67, 369/68; 382/314, 188
See application file for complete search history.

(56) References Cited

U.S. PATENT DOCUMENTS 7,529,410 B2 * 5/2009 Wang et al. .................. 382/216

FOREIGN PATENT DOCUMENTS

| JP | 05-089290 A | 4/1993 |
|---|---|---|
| JP | 07-325886 A | 12/1995 |
| JP | 10-269319 A | 10/1998 |
| JP | 2005-107900 A | 4/2005 |
| JP | 2006-221233 A | 8/2006 |

* cited by examiner

*Primary Examiner* — Eric A Rust
(74) *Attorney, Agent, or Firm* — Sughrue Mion, PLLC

(57) ABSTRACT

A trace information processing apparatus includes: a positional information acquisition unit acquiring positional information pieces respectively indicating positions where elements constituting an electronic document are located in the electronic document; a trace information acquisition unit acquiring trace information pieces respectively indicating traces on which an electronic writing tool has passed in an operation performed plural times in which the electronic writing tool is moved on a medium having the electronic document printed thereon while the electronic writing tool is in contact with the medium; a generation unit generating a trace information group by grouping the trace information pieces; a characteristic information acquisition unit acquiring characteristic information on a position where the trace information group is located in the electronic document; and a determination unit determining one of the elements as one element with which the trace information group is associated, based on the positional information pieces and the characteristic information.

21 Claims, 21 Drawing Sheets

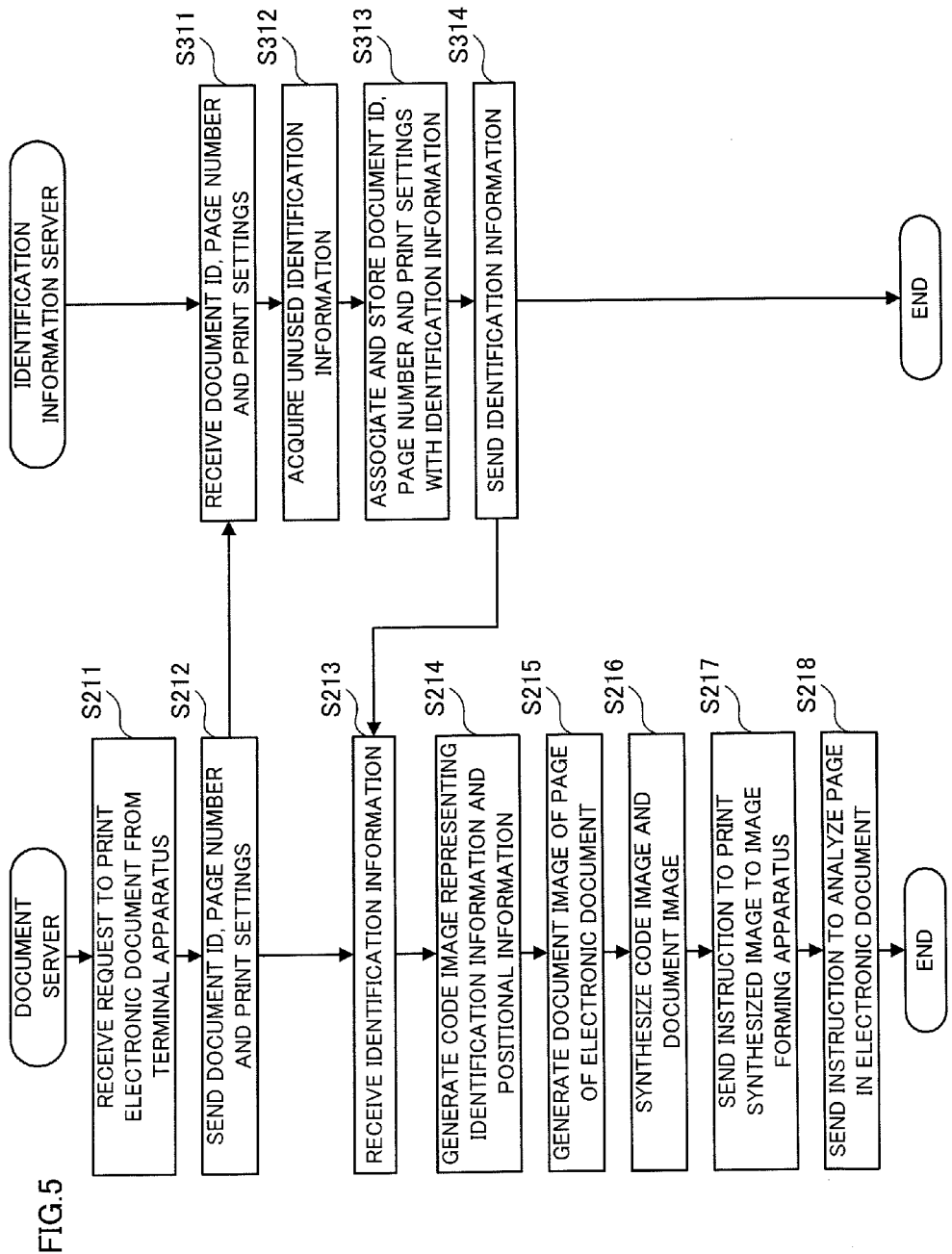

FIG.6A

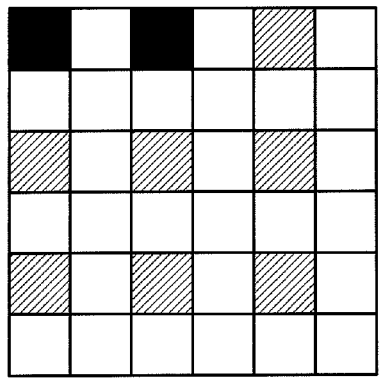

FIG.6B

| SYNCHRO-NOUS CODE 2bit | X POSITION CODE 5bit | X POSITION CODE 5bit | X POSITION CODE 5bit | X POSITION CODE 5bit |
|---|---|---|---|---|
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |

FIG.7

| IDENTIFICATION INFORMATION | DOCUMENT ID | PAGE NUMBER | PRINT SETTING |
|---|---|---|---|
| 000001 | DocA | 1 | A4,100%,... |
| 000002 | DocA | 2 | A4,100%,... |
| 000003 | DocA | 3 | A4,100%,... |
| 000004 | DocB | 1 | B4,100%,... |
| 000005 | DocB | 2 | B4,100%,... |
| 000006 | DocB | 3 | B4,100%,... |
| 000007 | DocC | 1 | A4,75%,... |
| 000008 | DocC | 2 | A4,75%,... |
| 000009 | DocC | 3 | A4,75%,... |
| ... | ... | ... | ... |

FIG.9

| DOCUMENT ID | PAGE NUMBER | COORDINATE INFORMATION | WRITING FRAME ID |
|---|---|---|---|
| DocA | 1 | LA11,RA11,TA11,BA11 | FieldA11 |
| DocA | 1 | LA12,RA12,TA12,BA12 | FieldA12 |
| DocA | 1 | LA13,RA13,TA13,BA13 | FieldA13 |
| DocA | 1 | LA14,RA14,TA14,BA14 | FieldA14 |
| DocA | 1 | LA15,RA15,TA15,BA15 | FieldA15 |
| ... | ... | ... | ... |
| DocA | 2 | LA21,RA21,TA21,BA21 | FieldA21 |
| DocA | 2 | LA22,RA22,TA22,BA22 | FieldA22 |
| DocA | 2 | LA23,RA23,TA23,BA23 | FieldA23 |
| DocA | 2 | LA24,RA24,TA24,BA24 | FieldA24 |
| DocA | 2 | LA25,RA25,TA25,BA25 | FieldA25 |
| ... | ... | ... | ... |

FIG.13

| STROKE ID | DOCUMENT ID | PAGE NUMBER | STROKE INFORMATION |
|---|---|---|---|
| SA101 | DocA | 1 | (XA111,YA111),(XA112,YA112),(XA113,YA113),... |
| SA102 | DocA | 1 | (XA121,YA121),(XA122,YA122),(XA123,YA123),... |
| SA103 | DocA | 1 | (XA131,YA131),(XA132,YA132),(XA133,YA133),... |
| SA104 | DocA | 1 | (XA141,YA141),(XA142,YA142),(XA143,YA143),... |
| SA105 | DocA | 1 | (XA151,YA151),(XA152,YA152),(XA153,YA153),... |
| SA106 | DocA | 1 | (XA161,YA161),(XA162,YA162),(XA163,YA163),... |
| SA107 | DocA | 1 | (XA171,YA171),(XA172,YA172),(XA173,YA173),... |
| SA108 | DocA | 1 | (XA181,YA181),(XA182,YA182),(XA183,YA183),... |
| SA109 | DocA | 1 | (XA191,YA191),(XA192,YA192),(XA193,YA193),... |
| ... | ... | ... | ... |

FIG.17

| STROKE GROUP ID | STROKE ID | WRITING FRAME ID |
|---|---|---|
| GA11 | SA101,SA102,SA103,SA104,SA105,SA106,... | |
| GA12 | SA107,SA108,SA109,SA110,SA111,SA112,SA113,SA114,SA115, SA116,SA117,SA118,... | |
| GA13 | SA119,SA120,SA121,SA122,SA123,... | |
| GA14 | SA124,SA125,SA126,SA127,SA128,SA129,SA130,SA131,... | |
| GA15 | SA132,SA133,... | |
| ... | ... | |

HANDWRITING RECOGNITION USING AN ELECTRONIC STYLUS

CROSS REFERENCE TO RELATED APPLICATIONS

This application is based on and claims priority under 35 USC §119 from Japanese patent application No. 2010-249648 filed Nov. 8, 2010.

BACKGROUND

1. Technical Field

The present invention relates to a trace information processing apparatus, a trace information processing system, a trace information processing method and a computer readable medium storing a program.

2. Related Art

A handwriting recognition apparatus is known which allows an operator to change the size of an entry frame according to his/her preference.

Moreover, an input data acquiring method is known which is capable of increasing processing efficiency of acquiring a sequence of coordinate points corresponding to input to the outside of a character entry frame and character recognition efficiency at that time.

An online input method for handwritten characters is also known in which data mistakenly inputted in a single frame by a user is sectioned into plural characters that the user intended to input and is recognized as the characters.

An identification system is also known which is capable of easily and accurately identifying an item in which a user intends to write a symbol or the like even thought the symbol is written over two or more adjacent items.

Moreover, a sheet form for an electronic pen is known which is capable of improving the recognition accuracy by having an entry area which is designed to attract user's attention to above the bottom thereof and is not made smaller than necessary.

SUMMARY

According to an aspect of the present invention, there is provided a trace information processing apparatus including: a positional information acquisition unit that acquires plural pieces of positional information respectively indicating positions where plural elements constituting an electronic document are located in the electronic document; a trace information acquisition unit that acquires plural pieces of trace information respectively indicating plural traces on which an electronic writing tool has passed in an operation performed plural times in which the electronic writing tool is moved on a medium having the electronic document printed thereon while the electronic writing tool is in contact with the medium; a generation unit that generates a trace information group by grouping the plural pieces of trace information acquired by the trace information acquisition unit; a characteristic information acquisition unit that acquires characteristic information on a position where the trace information group generated by the generation unit is located in the electronic document; and a determination unit that determines one of the plural elements as one element with which the trace information group is associated, on the basis of the plural pieces of positional information acquired by the positional information acquisition unit and the characteristic information acquired by the characteristic information acquisition unit.

BRIEF DESCRIPTION OF THE DRAWINGS

Exemplary embodiment(s) of the present invention will be described in detail based on the following figures, wherein:

FIG. 5 is a sequence chart showing an operational example of the exemplary embodiment on the occasion of outputting the print document;

FIGS. 6A and 6B are diagrams showing an example of the code image generated in the exemplary embodiment;

FIG. 7 is a table showing an example of the medium management information stored in the exemplary embodiment;

FIG. 9 is a table showing an example of contents stored in the writing frame information storage unit of the handwriting information server according to the exemplary embodiment;

FIG. 13 is a table showing an example of the stroke management information used in the exemplary embodiment;

FIG. 17 is a table showing an example of contents stored in the stroke group management information storage portion of the handwriting information server according to the exemplary embodiment;

DETAILED DESCRIPTION

Hereinafter, a detailed description is given of an exemplary embodiment of the present invention with reference to the attached drawings.

First, the overall configuration of a computer system of the present exemplary embodiment is described.

Figure 1:
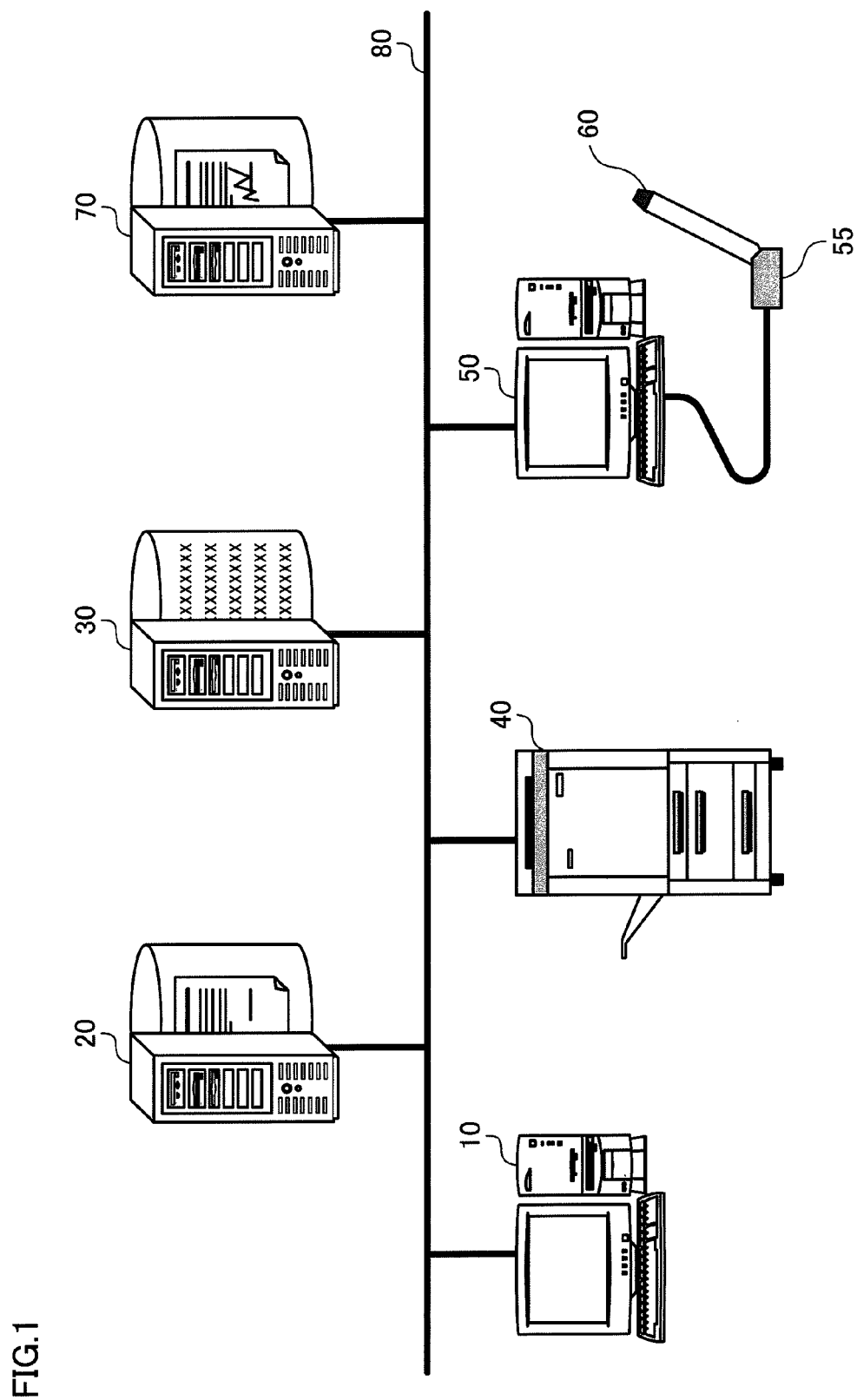
FIG. 1 is a diagram showing a configuration example of the computer system to which the exemplary embodiment is applied.

FIG. 1 shows a configuration example of the computer system of the present exemplary embodiment.

As shown in the drawing, the computer system includes a terminal apparatus 10, a document server 20, an identification information server 30, an image forming apparatus 40, a terminal apparatus 50, and a handwriting information server 70, which are connected to a network 80. A digital pen 60 is connected to the terminal apparatus 50 through a communication apparatus 55.

The terminal apparatus 10 is a computer apparatus which requests the document server 20 to print an electronic document. Here, for example, a personal computer (PC) may be used as the terminal apparatus 10.

The document server 20 is a computer apparatus which stores and manages electronic documents. Upon receiving a request to print an electronic document from the terminal apparatus 10, the document server 20 generates an image of the electronic document and a code image expressing the identification information and positional information, and outputs a print instruction to the image forming apparatus 40, the print instruction instructing to print a synthesized image of the image of the electronic document and the code image on a medium. In this case, the identification information is information used to uniquely specify the medium, and the positional information is information used to specify a coordinate position on the medium. Here, for example, a PC may be used as the document server 20.

The identification information server 30 is a computer apparatus which issues identification information to be assigned to the medium. The identification information server 30 associates the issued identification information with the electronic document to be printed on a medium to which the identification information is assigned, and stores the identification information. Here, for example, a PC may be used as the identification information server 30.

The image forming apparatus 40 is an apparatus which prints an image on a medium to output the image as a print document. The image forming apparatus 40 may include only a printer function or may additionally include a scanner or facsimile function. Here, for example, an electrophotographic method may be used as the image forming method of the image forming apparatus 40, but other methods may be used also. In the following description, it is assumed that the identification information to be assigned to a medium is issued by the identification information server 30. However, the identification information may be issued by any apparatus as long as the apparatus is capable of not causing the pieces of issued identification information to be redundant in the system. The identification information may be issued by the image forming apparatus 40. In such a case, for example, information being a combination of a mechanical number of the image forming apparatus 40 and a count value of prints in the image forming apparatus 40 may be used as the identification information.

The terminal apparatus 50 is a computer apparatus which sends, to the handwriting information server 70, information which is an electronic form of writing in the print document (hereinafter, referred to as handwriting information) to reflect the information on an electronic document being a source of an image recorded on the printed document. Moreover, the terminal apparatus 50 may be configured to display, on a display, the electronic document on which the handwriting information is to be reflected and superimpose the handwriting information thereon. Here, for example, a PC may be used as the terminal apparatus 50. In the following description, the handwriting information is mainly assumed to be information written by hand. However, the handwriting information is not limited to this and may be information mechanically drawn by a device outputting drawing data of buildings, machines, and the like, such as a plotter.

The communication apparatus 55 is an apparatus which acquires the handwriting information from the digital pen 60 and sends the handwriting information to the terminal apparatus 50. For example, the communication apparatus 55 may be provided with a slot to which the digital pen 60 is inserted and may be configured to send, to the terminal apparatus 50, the handwriting information stored in the digital pen 60 when the digital pen 60 is inserted into the slot. Here, various systems are conceivable as a communication system between the terminal apparatus 50 and the communication apparatus 55, such as universal serial bus (USB), Bluetooth (registered trademark), and infrared communication functions. In the figure, the communication apparatus 55 is shown as a unit separate from the digital pen 60. However, the communication apparatus 55 need not be a separate body and may be a unit integrated with the digital pen 60.

The digital pen 60 is a pen device used to write characters and figures on a print document. The digital pen 60 is provided with an image pickup element which reads the code image printed on a medium. The digital pen 60 then detects positional information from the code image read by the image pickup element, and generates and stores the handwriting information on the basis of the detected positional information. Here, the handwriting information is image data of written characters or figures. In the present exemplary embodiment, the digital pen 60 is provided as an example of an electronic writing tool or a trace information generation apparatus.

The handwriting information server 70 is a computer apparatus managing the handwriting information of a medium on which an electronic document (for example, document data of a sheet form) managed by the document server 20 is printed (for example, a handwriting sheet form). Particularly, in the present exemplary embodiment, the handwriting information server 70 includes a function of assigning information which is an electronic form of a stroke on the medium (hereinafter, referred to as stroke information) to a writing frame provided on the medium. The stroke refers to a trace of the digital pen 60 in an operation in which the digital pen 60 is moved while being in contact with the medium, i.e. a trace written with the digital pen 60 at one stroke. Here, for example, a PC may be used as the handwriting information server 70. In the present exemplary embodiment, the stroke information is used as an example of the trace information, and the handwriting information server 70 is provided as an example of a trace information processing apparatus.

The network 80 is a communication system used to exchange various types of information. Examples of the network 80 are the Internet or a LAN (local area network).

In this specification, the electronic data being a source of an image to be recorded on a medium is referred to as an "electronic document." However, this does not suggest that the "electronic document" includes only electronic data of a document including text. For example, the "electronic document" also refers to image data of pictures, photographs, figures, and the like (regardless of raster or vector data), data recorded by database management software or spreadsheet software, and other printable electronic data.

In this specification, the "medium" may be made of any material as long as an image is printable on the medium. A typical example of the material is paper. However, the medium may be an OHP sheet, a metallic plate, or the like.

Furthermore, in this specification, processes are performed using the identification information for uniquely identifying each of the electronic document, medium, digital pen 60, stroke, and the like. However, in a case of simply referring to "identification information," the "identification information" refers to the identification information of the medium.

In the present exemplary embodiment, in the above-described computer system, three steps of operation are performed, which are output of the print document, writing on the print document, and assignment of the stroke to the writing frame. These steps are individually described below.

[Output of Print Document]

In outputting the print document, the document server 20 and identification information server 30 operate to play a central role, and in addition, the handwriting information server 70 also operates. The configurations of these servers are described below.

First, the configuration of the document server 20 is described.

Figure 2:
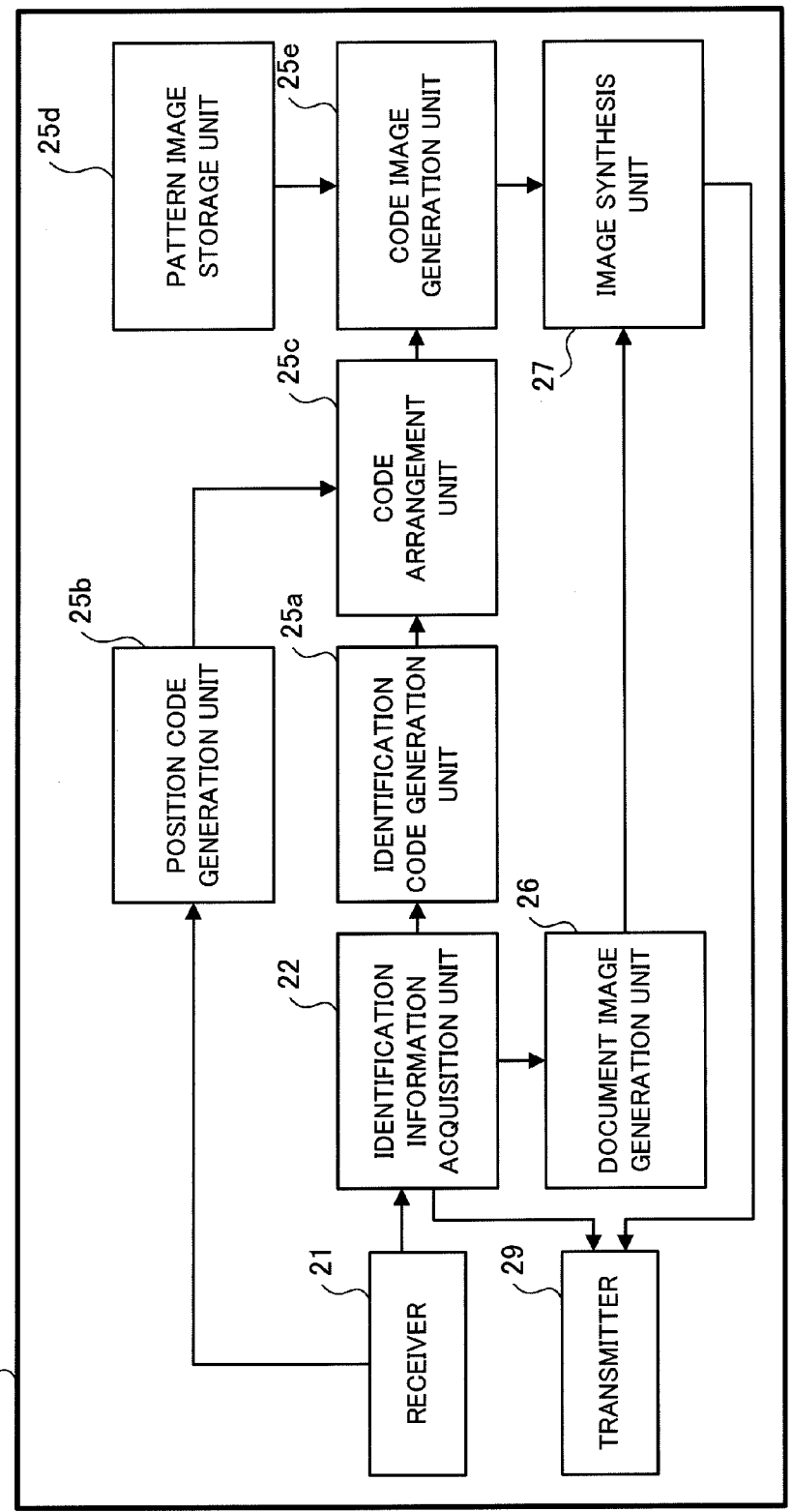
FIG. 2 is a block diagram showing a functional configuration example of the document server according to the exemplary embodiment.

FIG. 2 is a block diagram showing a functional configuration example of the document server 20.

As shown in the figure, the document server 20 includes a receiver 21 and an identification information acquisition unit 22. The document server 20 further includes an identification code generation unit 25a, a position code generation unit 25b, a code arrangement unit 25c, a pattern image storage unit 25d, and a code image generation unit 25e. The document server 20 further includes a document image generation unit 26, an image synthesis unit 27, and a transmitter 29.

The receiver 21 receives a print request from the terminal apparatus 10. The print request includes the identification information of the electronic document to be printed (hereinafter, referred to as a document ID), a page number of a page to be printed in the electronic document, and various settings concerning printing (hereinafter, referred to as print settings).

The identification information acquisition unit 22 acquires the document ID, page number, and print settings from the receiver 21. Then, the identification information acquisition unit 22 transfers the document ID, page number, and print settings to the transmitter 29, and instructs transmission of a request to issue the identification information. In addition, the identification information acquisition unit 22 transfers the acquired document ID, page number, and print settings to the document image generation unit 26 and instructs generation of a document image. Moreover, the identification information acquisition unit 22 acquires the identification information from the receiver 21, transfers the identification information to the identification code generation unit 25a, and instructs generation of an identification code.

The identification code generation unit 25a encodes the identification information specifying a medium to generate identification codes.

The position code generation unit 25b encodes the positional information indicating coordinate positions on the medium to generate position codes.

The code arrangement unit 25c arranges the identification codes generated by the identification code generation unit 25a, the position codes generated by the position code generation unit 25b, and the like in a two-dimensional plane according to a predetermined layout to generate a two-dimensional code array.

The pattern image storage unit 25d stores a pattern image corresponding to code values of codes stored in the code array.

The code image generation unit 25e refers to the two-dimensional code array generated by the code arrangement unit 25c and selects a pattern image corresponding to each code value to generate a code image.

The document image generation unit 26 acquires the document ID, page number, and print settings from the identification information acquisition unit 22, reads a page of an electronic document specified by the acquired document ID and page number from a not-shown storage unit, and generates a document image of the electronic document according to the print settings.

The image synthesis unit 27 synthesizes the code image generated by the code image generation unit 25e and the document image generated by the document image generation unit 26 to generate a synthesized image.

The transmitter 29 sends the identification information server 30 a request to issue the identification information. The transmitter 29 also sends the image forming apparatus 40 an instruction to print an image on a medium.

Next, the configuration of the identification information server 30 is described.

Figure 3:
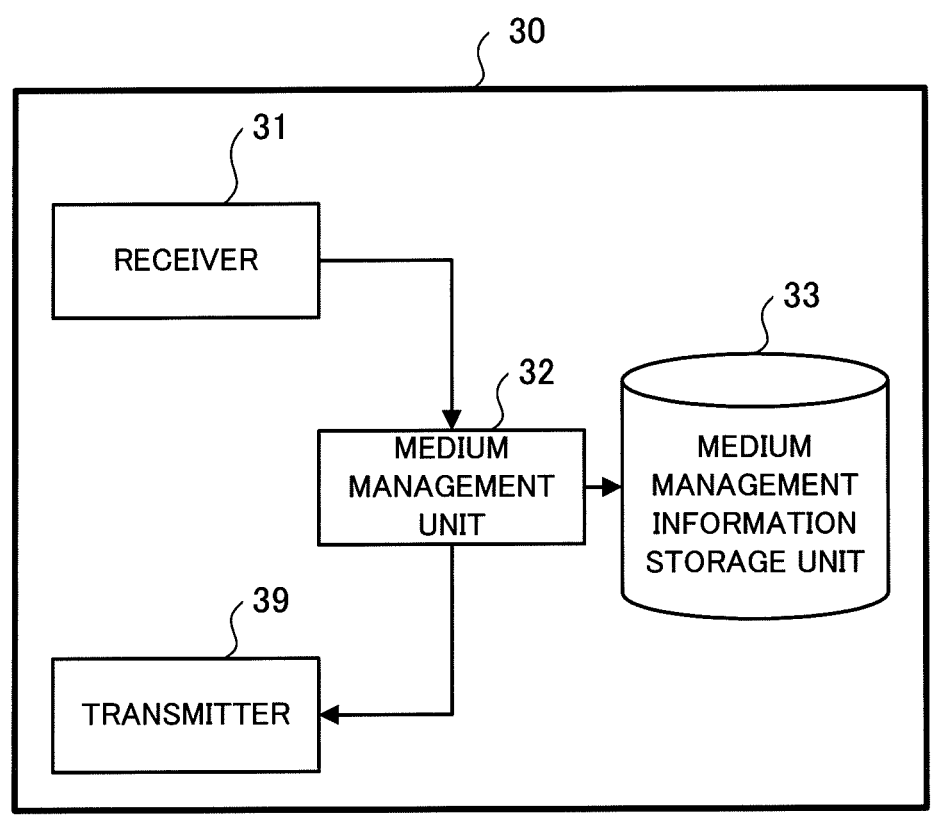
FIG. 3 is a block diagram showing a functional configuration example of the identification information server according to the exemplary embodiment.

FIG. 3 is a block diagram showing a functional configuration example of the identification information server 30.

As shown in the figure, the identification information server 30 includes a receiver 31, a medium management unit 32, a medium management information storage unit 33, and a transmitter 39.

The receiver 31 receives the request to issue the identification information from the document server 20. Moreover, the receiver 31 receives, from the handwriting information server 70, a request to search for the document ID, page number, and print settings on the basis of specified identification information.

The medium management unit 32 issues unique identification information upon receiving the request to issue identification information. Then, the medium management unit 32 associates the specified document ID, page number, and print settings with the identification information, and stores them. When the identification information is specified, the medium management unit 32 extracts the document ID, page number, and print settings associated with the identification information.

The medium management information storage unit 33 is a database storing the identification information, the document ID of the electronic document printed on a medium to which the above identification information is assigned, the page number of a page of the electronic document printed on the medium to which the above identification information is assigned, and the print settings set when the electronic document is printed on the medium to which the above identification information is assigned.

The transmitter 39 sends the document server 20 the identification information issued in response to the request from the document server 20. Moreover, the transmitter 39 sends the handwriting information server 70 the document ID, page number, and print settings extracted in response to the request from the handwriting information server 70.

Next, the configuration of the handwriting information server 70 is described.

Figure 4:
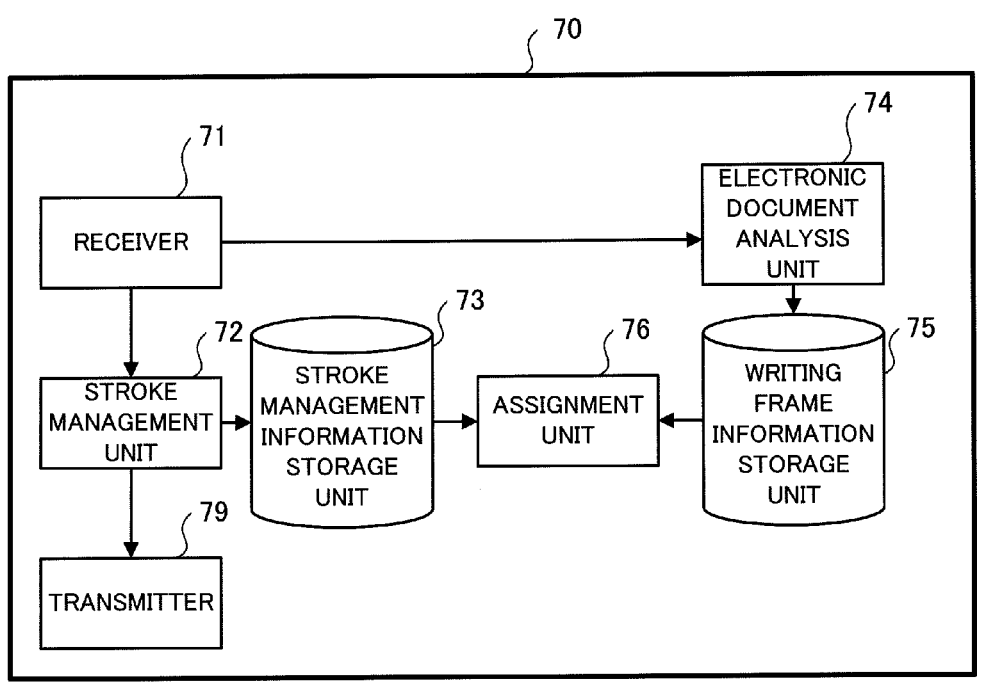
FIG. 4 is a block diagram showing a functional configuration example of the handwriting information server according to the exemplary embodiment.

FIG. 4 is a block diagram showing a functional configuration example of the handwriting information server 70. The handwriting information server 70 operates to play a central role in later described writing to the print document and assignment of a stroke to a writing frame. FIG. 4 therefore also shows the configuration for writing to the print document and assignment of a stroke to a writing frame.

As shown in the figure, the handwriting information server 70 includes a receiver 71, a stroke management unit 72, a stroke management information storage unit 73, an electronic document analysis unit 74, a writing frame information storage unit 75, an assignment unit 76, and a transmitter 79.

The receiver 71 receives the document ID of the electronic document to be printed and the page number of the page to be printed from the document server 20 upon being instructed to output the print document. Moreover, when the writing is performed on the print document, the receiver 71 receives the identification information, stroke information, and identification information of the digital pen 60 (hereinafter, referred to as a pen ID) from the terminal apparatus 50. In the present exemplary embodiment, the receiver 71 is provided as an example of a receiver receiving plural pieces of trace information.

The stroke management unit 72 acquires the identification information, stroke information, and pen ID which are received by the receiver 71. The stroke management unit 72 then associates stroke management information with the pen ID, and stores them in the stroke management information storage unit 73. In the stroke management information, identification information of the stroke (hereinafter, referred to as a stroke ID), the document ID and page number acquired based on the identification information, and the stroke information are associated with each other. In the present exemplary embodiment, the stroke management unit 72 is provided as an example of a trace information acquisition unit acquiring plural pieces of trace information.

The stroke management information storage unit 73 stores the stroke management information managed by the stroke management unit 72.

The electronic document analysis unit 74 analyses the page of the electronic document to be printed which is received from the document server 20 and extracts a writing frame. The electronic document analysis unit 74 also generates coordinate information of the writing frame in the electronic document. In the present exemplary embodiment, the writing frame is used as an example of an element constituting the electronic document. The electronic document analysis unit 74 is provided as an example of a positional information acquisition unit acquiring plural pieces of positional information respectively indicating positions of plural elements in the electronic document. In this specification, the positions in the electronic document refer to positions in the electronic document expanded in a viewable form.

The writing frame information storage unit 75 stores information concerning the writing frame extracted in the analysis performed by the electronic document analysis unit 74 (hereinafter, referred to as writing frame information).

The assignment unit 76 assigns the stroke information of the stroke management information stored in the stroke management information storage unit 73 to the writing frame in the writing frame information stored in the writing frame information storage unit 75.

The transmitter 79 sends, through the terminal apparatus 50, the digital pen 60 information indicating that the stroke information received by the receiver 71 is registered, when writing to the print document.

Next, the operation of outputting the print document is described.

FIG. 5 is a sequence chart showing operations of the document server 20 and the identification information server 30 in the operation of outputting the print document.

In the document server 20, first, the receiver 21 receives a request to print an electronic document from the terminal apparatus 10 (Step 211). This request to print an electronic document includes the document ID, page number, and print settings. The document ID may be, for example, a uniform resource locator (URL), but may be other information if the information is capable of uniquely specifying the electronic document. The page number is a numeral or the like indicating the order of the pages in the electronic document. The page number is sometimes included in the print settings. However, in the present exemplary embodiment, the page number is considered as information used to specify electronic data being a source of the document image to be printed on a medium, and is therefore described separately from the print settings. The print settings include settings such as the number of copies, paper sheet size, a scaling factor, a function of outputting several pages together in one medium, and margins.

Upon receiving such information, the receiver 21 transfers the received information to the identification information acquisition unit 22. The identification information acquisition unit 22 then transfers the transferred information to the transmitter 29. The transmitter 29 then sends the information to the identification information server 30 to request the identification information server 30 to issue identification information (Step 212).

In the identification information server 30, the receiver 31 then receives the document ID, page number, and print settings (Step 311). The document ID, page number, and print settings are transferred to the medium management unit 32. The medium management unit 32 then extracts unused identification information from the medium management information storage unit 33 (Step 312). The number of the extracted pieces of identification information is determined according to the print settings. Specifically, the number of pieces of identification information extracted is basically equal to a number obtained by multiplying the number of pages to be printed by the number of copies. In addition, if there is a designation of function to output several pages together in a single medium in the setting information and the like, such designation is also considered. For example, when every two pages of 10 pages of electronic document are arranged together on a single medium and five copies of the electronic document are printed, 25 (=10/2×5) pieces of identification information are extracted.

Next, the medium management unit 32 associates the identification information, document ID, page number, and print settings to each other, and stores them in the medium management information storage unit 33 (Step 313). The identification information issued in Step 312 is transferred to the transmitter 39. The transmitter 39 then sends the identification information to the document server 20 (Step 314).

Thereafter, in the document server 20, the receiver 21 receives the identification information (Step 213) and then transfers the received identification information to the identification information acquisition unit 22.

Subsequently, the document server 20 generates a code image representing the identification information and positional information (Step 214). The generation of the code image is performed by the following process.

Specifically, first, the identification information acquisition unit 22 transfers the identification information acquired in Step 213 to the identification code generation unit 25a. The identification code generation unit 25a then encodes the identification information to generate identification codes. The detail of the encoding of the identification information is described later.

Moreover, the position code generation unit 25*b* receives the print settings from the receiver 21 and then encodes the positional information in a range corresponding to the print settings to generate position codes. The detail of the encoding of the positional information is also described later.

Subsequently, the code arrangement unit 25*c* arranges the identification codes and position codes according to a predetermined layout. The code image generation unit 25*e* images the identification codes and position codes by using pattern images stored in the pattern image storage unit 25*d* to generate a code image.

In the document server 20, the document image generation unit 26 generates a document image of a page of the electronic document (Step 215). At that time, the document image generation unit 26 receives the document ID and page number acquired by the identification information acquisition unit 22 in Step 211, and reads the page of the electronic document to be printed from a not-shown storage unit on the basis of the received document ID and page number. Moreover, the document image generation unit 26 receives the print settings acquired by the identification information acquisition unit 22 in Step 211, and generates a document image on the basis of the received print settings.

The image synthesis unit 27 synthesizes the code image generated in Step 214 and the document image generated in Step 215 to generate a synthesized image (Step 216).

Subsequently, the synthesized image is transferred to the transmitter 29. The transmitter 29 then sends an instruction to print the synthesized image to the image forming apparatus 40 (Step 217). Here, the instruction to print the synthesized image is sent, for example, in a page description language (PDL) format in which the contents to be printed as the code image is set as a PDL command in a PDL file composed of rows of instructions to print a document image.

The image forming apparatus 40 thus prints the document image on a medium by using C (cyan), M (magenta), and Y (yellow) toners, for example. Moreover, the image forming apparatus 40 prints the code image on a medium by using a K toner (black including carbon) or a special toner, for example.

Herein, a specific example of the special toner includes an invisible toner with a maximum absorption rate in visible light region (400 nm to 700 nm) being not more than 7% and an absorption rate in a near-infrared region (800 nm to 1000 nm) being not less than 30%. Herein, the terms "visible" and "invisible" do not depend on whether the toner is visually recognizable. The "visible" and "invisible" are distinguished based on whether an image in the print document is recognizable or not by the presence or the absence of the chromogenic property due to absorption of light of a particular wavelength in the visible light region. Moreover, the "invisible" toner includes a toner which has a slight chromogenic property due to absorption of light of a particular wavelength in the visible light region but is difficult to recognize with human eyes.

Here, the code image is synthesized with the image of the electronic document to be printed, but may be printed on a blank sheet of paper (a notebook, a sticky, or the like). In such a case, it may be configured that document ID and page number are not included in the request for printing which is received in Step 211, and that the identification information is not associated with the document ID, page number, and print settings in Step 313. Moreover, it may be configured that the document image is not generated in Step 215.

In the present exemplary embodiment, in the document server 20, finally, the transmitter 29 sends the handwriting information server 70 an instruction to analyze the page in the electronic document to be printed (Step 218). At this time, the transmitter 29 may be configured to send the electronic document to be printed together with the document ID of the electronic document and the page number of the page to be printed in the electronic document.

Next, the code image generated in the present exemplary embodiment is described.

FIGS. 6A and 6B are diagrams showing an example of images constituting the code image and the like.

First, a description is given of a unit pattern constituting the code image.

FIG. 6A shows a specific example of a unit pattern.

The unit pattern is a minimum unit of embedding information. In the figure, black regions and shaded regions are set to be dot placeable regions, and white regions therebetween are set to be dot unplaceable regions. Among the dot placeable regions, dots are placed in the black regions and not placed in the shaded regions. In other words, the figure shows a specific example of the unit pattern formed by placing dots in two places selected from nine places where dots are allowed to be placed. Herein, there are 36 combinations of selecting two places out of nine places ($=_9C_2$). Accordingly, there are 36 types of unit patterns. Four types of unit patterns among the 36 types of unit patterns are used as synchronous patterns. The synchronous patterns are patterns for detecting rotation of an image and specifying relative positions of the identification codes and position codes. Since it is necessary to detect rotation of an image, in particular, the four types of synchronous patterns are selected so that one of the synchronous patterns is equal to another one of the synchronous patterns when rotated by 90 degrees. The 32 types of unit patterns except for these four types of unit patterns are used as information patterns expressing the identification codes and position codes. Those unit patterns each express 5-bit information.

The dots shown in FIG. 6A are dots for expressing information and are not necessarily equal to dots that mean the smallest points constituting an image. In the present exemplary embodiment, each of the dots for expressing information (smallest squares in FIG. 6A) has a size of 2 by 2 dots in 600 dpi. Since each dot in 600 dpi has a size of 0.0423 mm, one side of each dot for expressing information (smallest square in FIG. 6A) is 84.6 μm (=0.0423 mm×2). The larger the dots for expressing information are, the more easily the dots for expressing information are spotted. It is therefore preferable that the dots for expressing information are smaller. However, if the dots for expressing information are excessively small, the dots for expressing information cannot be printed with a printer. Accordingly, the size of the dots for expressing information takes the aforementioned value which is larger than 50 μm and smaller than 100 μm. Note that, the above value of 84.6 μm is only a calculated numerical value, and the size of the dots for expressing information is about 100 μm in an actually printed toner image. The term "dot(s)" in this specification refers not to the dot(s) indicating the smallest point(s) constituting an image but to the dot(s) for expressing information, if not clearly specified.

Next, a description is given of a code block composed of the unit patterns described above.

FIG. 6B shows a specific example of a layout of the code block. Here, the layout is shown by not an image but by an array of codes just before the codes are replaced with pattern images. In other words, the unit pattern as shown in FIG. 6A (one of the 36 types of unit patterns) are arranged in the smallest squares in FIG. 6B (hereinafter, referred to as unit blocks), and an image thereof is formed on a medium.

In the layout of FIG. 6B, the synchronous code is arranged at an upper-left unit block in the code block. X position codes are arranged in four unit blocks on the right side of the unit block where the synchronous code is arranged. Y position codes are arranged in four unit blocks below the unit block where the synchronous code is arranged. Identification codes are arranged in 16 (=4×4) unit blocks surrounded by the unit blocks where the position codes are arranged.

Here, a description is given of encoding of the identification information.

To encode the identification information, a bit string constituting the identification information is divided into plural blocks for RS encoding. Although there are several methods for encoding, the RS encoding is suitable for the present exemplary embodiment. This is because the RS encoding is multilevel encoding, and the values expressed by the unit blocks correspond to multilevel values of RS encoding in this case. For example, in the case where one unit block is used to express 5-bit information, 60-bit identification information is divided into 12 blocks each with a block length of 5 bits. If RS encoding capable of correcting an error of two block is employed, the code length is 16 blocks. Accordingly, the identification information are accommodated in the unit blocks where the identification codes are to be arranged in the code block of FIG. 6B. The encoding method is not limited to RS encoding and may be another encoding method such as BCH encoding, for example.

Next, a description is given of encoding of the positional information.

The positional information is encoded using codes of M-sequence being a kind of pseudorandom sequence. Here, the M-sequence is a sequence which has the longest period among the code sequences generated by a shift resistor of a certain length and a feedback. The sequence length of M-sequence is $2^K-1$ where K is the number of stages of the shift resistor. There is a property that any K consecutive bits extracted from the M-sequence do not appear at the other positions in the same M-sequence. The positional information is encoded using this property.

In the present exemplary embodiment, the order of a necessary M sequence is calculated based on the length of the positional information to be encoded, and the M sequence is generated. However, when the length of the positional information to be encoded is previously known, it is not necessary to generate an M-sequence each time. In other words, a fixed M-sequence may be previously generated and stored in a memory or the like.

For example, it is assumed that an M sequence (K=13) with a sequence length of 8191 is used. In this case, since position codes are also embedded in units of 5 bits, every 5 bits are extracted from the M sequence with a sequence length of 8191, and formed into a block.

In this specification, for simplicity of explanation, the identification information and the positional information are clearly distinguished from each other. However, there is another method as follows. Positional information of wide range is prepared, and a different range of the positional information is cut out and embedded for each of media. Thus, the media are identified by the difference in positional information. In such a method, the positional information is considered to have a function to identify the media and is therefore regarded also as the identification information.

Here, a description is given of specific contents of medium management information stored in Step 313.

FIG. 7 is a table showing a specific example of the medium management information.

As shown in the figure, the medium management information is information in which the identification information, document ID, page number, and print settings are associated with each other.

Among these, the identification information is information for uniquely identifying a medium as described above.

The document ID is information to uniquely identify an electronic document as described above.

The page number is, for example, a numeral indicating a page of an electronic document as described above.

The print settings are information such as paper sheet size, scaling factor, and the like which are set when a request to print an electronic document is made in the terminal apparatus 10 as described above.

FIG. 7 shows that: the first, second, and third pages of an electronic document with a document ID of "DocA" are printed at 100% scaling on A4 size-media respectively with identification information of "000001," "000002," and "000003"; the first, second, and third pages of an electronic document with a document ID of "DocB" are printed at 100% scaling on B4 size-media respectively with identification information of "000004," "000005," and "000006"; and the first, second, and third pages of an electronic document with a document ID of "DocC" are printed at 75% scaling on A4 size-media respectively with identification information of "000007," "000008," and "000009." Here, each of the electronic documents specified by the document IDs of "DocA," "DocB," and "DocC" is an electronic document in which a sheet form for entering handwritten characters is written, for example.

Next, a description is given of the operation of the handwriting information server 70 which is performed in response to the sending of the analysis instruction in Step 218. In this specification, the coordinates on a page of an electronic document are expressed such that the rightward direction of the page is a positive direction of the X axis and the downward direction of the page is a positive direction of the Y axis.

First, in the handwriting information server 70, the receiver 71 receives an electronic document to be analyzed, the document ID thereof, and the page number of the printed page, and the electronic document analysis unit 74 stores them in a referable memory. The process of analyzing the page of the electronic document by the electronic document analysis unit 74 is then started.

Figure 8:
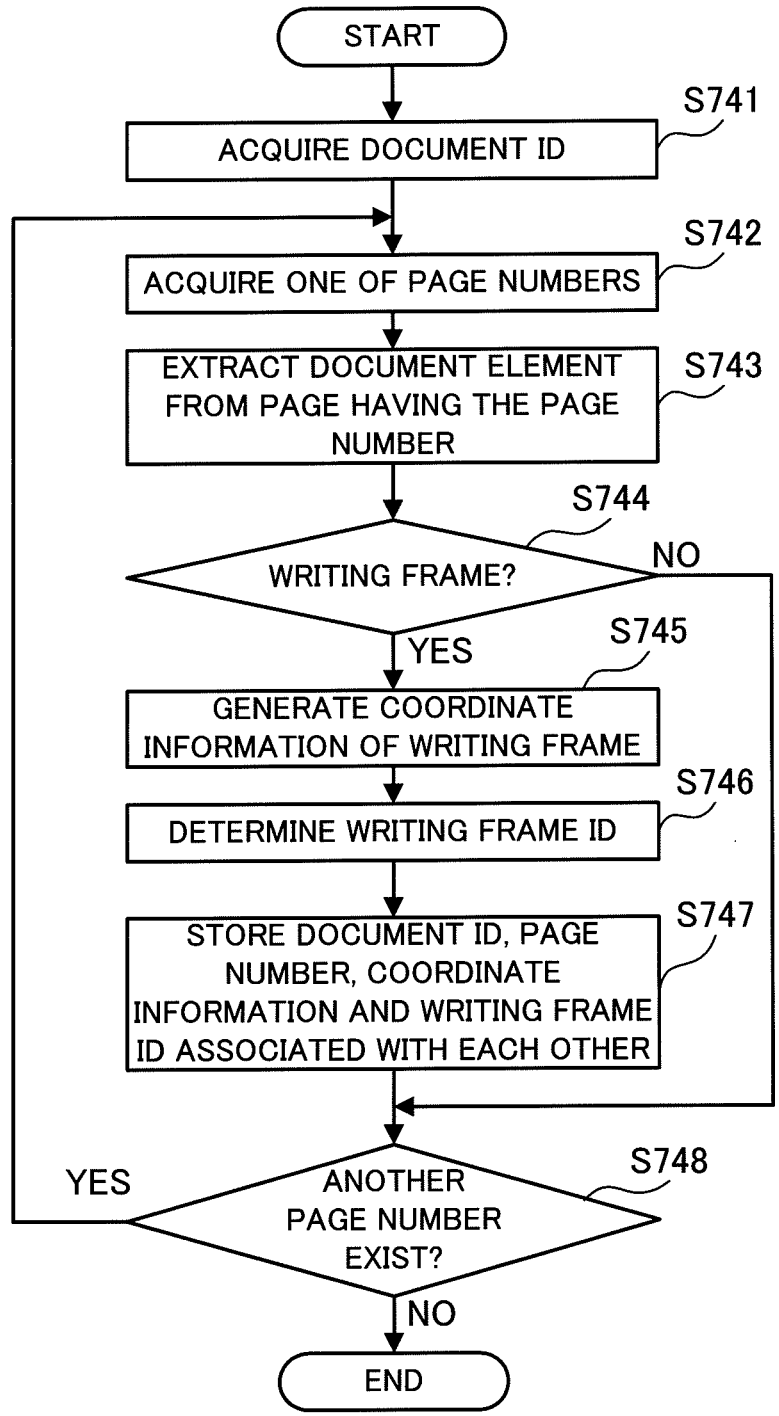
FIG. 8 is a flowchart showing an operational example of the electronic document analysis unit of the handwriting information server according to the exemplary embodiment.

FIG. 8 is a flowchart showing an operational example of the electronic document analysis unit 74 in the analysis process.

First, the electronic document analysis unit 74 acquires the document ID stored in the memory (Step 741).

Next, the electronic document analysis unit 74 acquires one of the page numbers stored in the memory (Step 742) and then extracts a document element from the page of the electronic document specified by the acquired page number, the document element being an element constituting the electronic document (Step 743).

The electronic document analysis unit 74 judges whether the extracted document element is a writing frame (Step 744). This judgment is conducted by examining whether the document element satisfies the following conditions. The document element is, for example, a figure having a predetermined shape such as a rectangle and also has a predetermined size, has a predetermined color, has a predetermined character written at a predetermined position relative to the document element, or the like.

If the document element is judged as being a writing frame, the electronic document analysis unit 74 generates coordinate information indicating the coordinates of the writing frame (Step 745). Here, information including X coordinates of the right and left ends of a region of the writing frame in the page of the electronic document and Y coordinates of the top and bottom ends thereof may be generated as the coordinate information.

Subsequently, the electronic document analysis unit 74 determines the identification information of the writing frame (hereinafter, referred to as a writing frame ID) (Step 746).

The electronic document analysis unit 74 stores the writing frame information in the writing frame information storage unit 75 (Step 747). In the writing frame information, the document ID acquired in Step 741, the page number acquired in Step 742, the coordinate information generated in Step 745, and the writing frame ID determined in Step 746 are associated with each other.

On the other hand, if the document element is judged as not being a writing frame in Step 744, the process proceeds to Step 748.

Thereafter, the electronic document analysis unit 74 judges whether there is another page number stored in the memory (Step 748). If there is another page number stored, the process of Steps 742 to 747 are repeated, and if there is no other page number stored, the process is terminated.

FIG. 9 is a table showing a specific example of the writing frame information.

As shown in the table, the writing frame information is information in which the document ID, page number, coordinate information, and writing frame ID are associated with each other.

The document ID is information for uniquely identifying each electronic document as described above. The document ID is acquired in Step 741.

The page number is, for example, a numeral indicating a page of the electronic document as described above. The page number is acquired in Step 742.

The coordinate information is information indicating the position of the corresponding writing frame in each page by using the X coordinates of the right and left ends of the writing frame and the Y coordinates of the top and bottom ends of the writing frame. Each string starting with "L" indicates the X coordinate of the left end; each string starting with "R" indicates the X coordinate of the right end; each string starting with "T" indicates the Y coordinate of the top end; and each string starting with "B" indicate the Y coordinate of the bottom end. The coordinate information is generated in Step 745.

The writing frame ID is information for uniquely identifying each writing frame as previously described. The writing frame ID is determined in Step 746.

[Writing to Print Document]

A user writes in a writing frame of a print document (for example, handwriting sheet form) outputted as described above. In the present exemplary embodiment, the writing to the print document is performed with the digital pen 60, and the handwriting information of the contents of the writing converted into an electronic form is stored in the handwriting information server 70. In other words, when the writing is performed on the print document, the digital pen 60 and handwriting information server 70 operate to play a central role, and thus the configurations thereof are described.

First, the configuration of the digital pen 60 is described.

Figure 10:
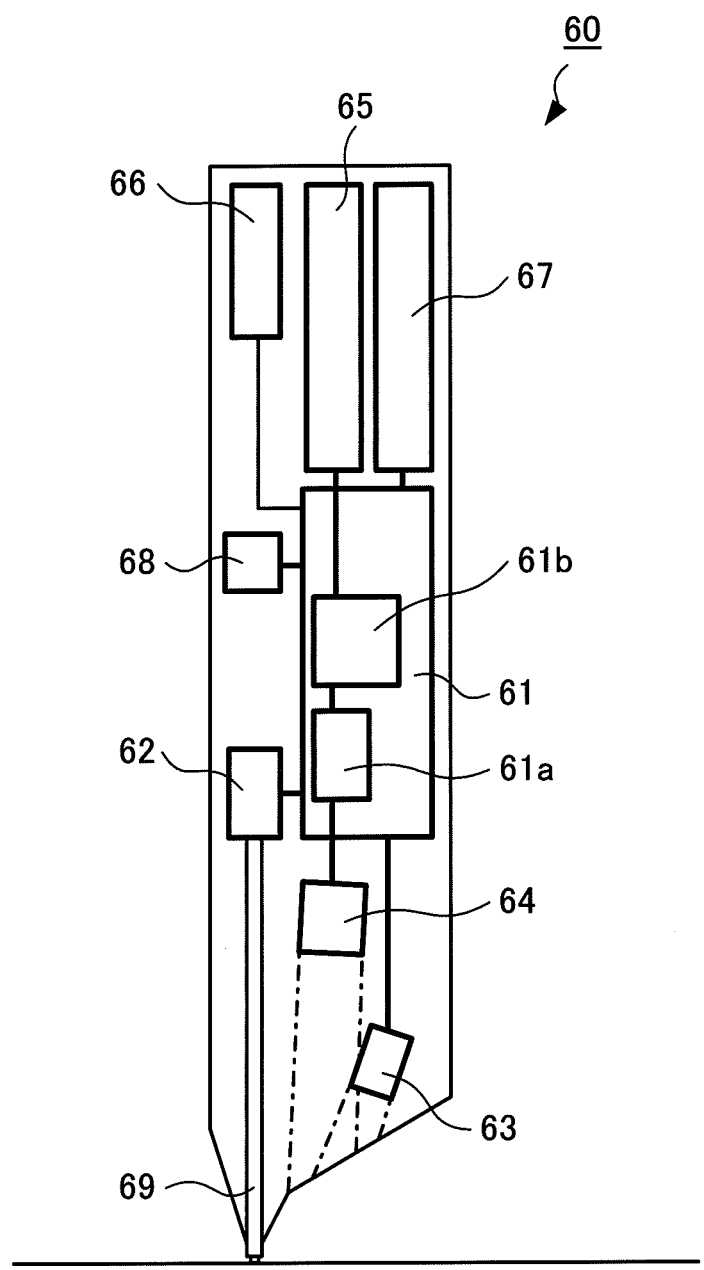
FIG. 10 is a diagram showing a configuration example of the digital pen according to the exemplary embodiment.

FIG. 10 is a diagram showing a configuration example of the digital pen 60.

As shown in the figure, the digital pen 60 includes a control circuit 61 controlling the entire operation of the pen. The control circuit 61 includes an image processing unit 61*a* that processes a read code image and a data processing unit 61*b* that extracts the identification information and positional information from the processing result by the image processing unit 61*a*.

A pressure sensor 62 is connected to the control circuit 61, the pressure sensor 62 detecting writing operation of the digital pen 60 by using pressure applied to a pen tip 69. Furthermore, an infrared LED 63 and an infrared CMOS 64 are connected to the control circuit 61. The infrared LED 63 irradiates a medium with infrared light, and the infrared CMOS 64 detects the reflected light to read the code image. An information memory 65, a communication circuit 66, a battery 67, and a pen ID memory 68 are also connected to the control circuit 61. The information memory 65 stores the identification information and positional information. The communication circuit 66 communicates with an external apparatus. The battery 67 drives the pen. The pen ID memory 68 stores the identification information of the pen (the pen ID).

Next, the functional configuration implemented in the control circuit 61 is described in further detail.

Figure 11:
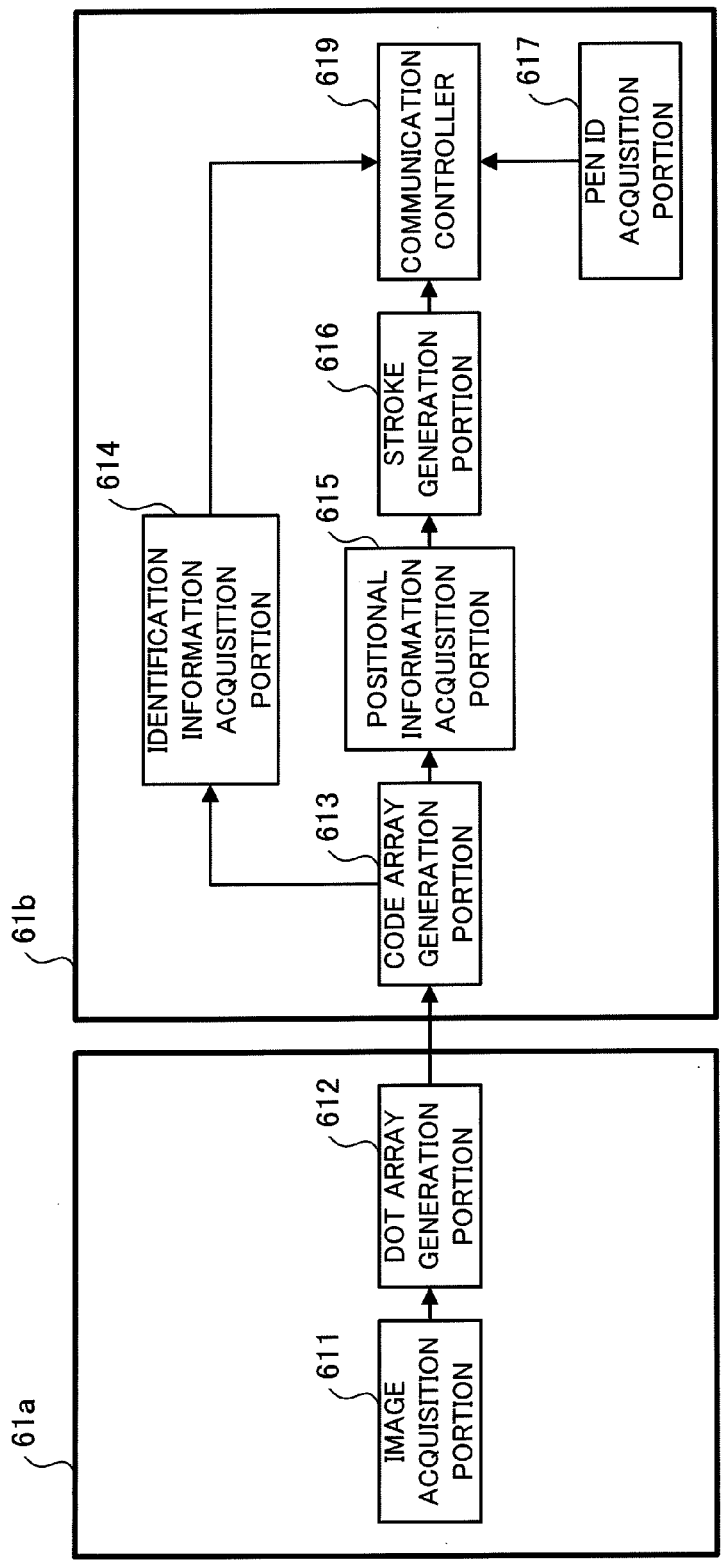
FIG. 11 is a block diagram showing a functional configuration example of the control circuit of the digital pen according to the exemplary embodiment.

FIG. 11 is a block diagram showing a functional configuration example of the control circuit 61. The figure shows a functional configuration example in which the image processing unit 61*a* and data processing unit 61*b* of the control circuit 61 are separate units.

As shown in the figure, the image processing unit 61*a* includes an image acquisition portion 611 and a dot array generation portion 612. The data processing unit 61*b* includes a code array generation portion 613, an identification information acquisition portion 614, a positional information acquisition portion 615, and a stroke generation portion 616. The data processing unit 61*b* further includes a pen ID acquisition portion 617 and a communication controller 619.

The image acquisition portion 611 acquires the code image read by the infrared CMOS 64 from the print document. The image acquisition portion 611 removes noise included in the code image if necessary.

The dot array generation portion 612 generates a dot array while referring to the positions of the dots in the code image. Specifically, the dot array generation portion 612 stores "1" at each position where a dot is located in a two-dimensional array and stores "0" at each position where no dot is located in the two-dimensional array, for example. Thus, the dots detected as the image is replaced with digital data. The dot array generation portion 612 then outputs this two-dimensional array as a dot array.

The code array generation portion 613 detects blocks on the dot array which correspond to the unit patterns in the code block. Specifically, frames each having the same shape and size as those of the blocks where the unit patterns are arranged are moved on the dot array and then fixed at such position that the numbers of dots in the respective frames are equal. For example, in the case of using the unit pattern of FIG. 6A, the code array generation portion 613 moves frames each having a size corresponding to 3×3 dots and fixes each frame at such position that the number of dots included in the frame is two. The code array generation portion 613 then generates a code array storing code values determined from the positions of dots in each block partitioned by the frame. When the code array is generated, the predetermined code value of the synchronous code is retrieved to specify the position of the synchronous code.

The identification information acquisition portion 614 detects the identification codes from the code array on the basis of the position of the synchronous code. The identification information acquisition portion 614 then decodes the identification codes by using a parameter used in the RS coding process in the image generation, and thus acquires the identification information.

The positional information acquisition portion 615 detects the position codes from the code array on the basis of the position of the synchronous code. The positional information acquisition portion 615 then takes out a partial sequence of the M sequence from each position code, refers to the position of the partial sequence in the M sequence used in the image generation, and acquires, as the positional information, a value obtained by correcting the referred position with an offset obtained using the synchronous code. Note that, the correction with the offset is performed because the synchronous code is placed between position codes.

The stroke generation portion 616 generates a piece of stroke information by connecting pieces of positional information acquired in a period from when the pen tip of the digital pen 60 comes into contact with a medium to when the pen tip is moved away from the medium, the pieces of positional information being among the pieces of positional information acquired by the positional information acquisition portion 615. The stroke information includes at least data of a trace of the pen tip of the digital pen 60 which is converted into an electronic form, but may include other information. Examples of the information other than the trace of the pen tip are information of color set for the pen when the writing is performed and information of writing pressure.

The pen ID acquisition portion 617 acquires the pen ID being the identification information of the digital pen 60 from the pen ID memory 68 (see FIG. 10).

The communication controller 619 transfers, to the communication circuit 66, the identification information acquired by the identification information acquisition portion 614, the stroke information generated by the stroke generation portion 616, and the pen ID acquired by the pen ID acquisition portion 617 to implement information transmission to the communication apparatus 55. Moreover, the communication controller 619 receives a registration completion report from the communication circuit 66 which has received the stroke information registration completion report from the handwriting information server 70. In the present exemplary embodiment, the communication controller 619 is provided as an example of a transmitter that transmits plural pieces of trace information.

Next, a description is given of an operation which is performed when the digital pen 60 generates the stroke information and registers the stroke information in the handwriting information server 70.

In the digital pen 60, first, the infrared LED 63 irradiates a medium with infrared light, the infrared CMOS 64 receives the reflected light thereof, and a code image is read. The image acquisition portion 611 then acquires the read code image. If there is noise in the code image, the noise is then removed. Next, the dot array generation portion 612 converts the positions of dots included in the code image into digital data to generate a dot array.

Figure 12:
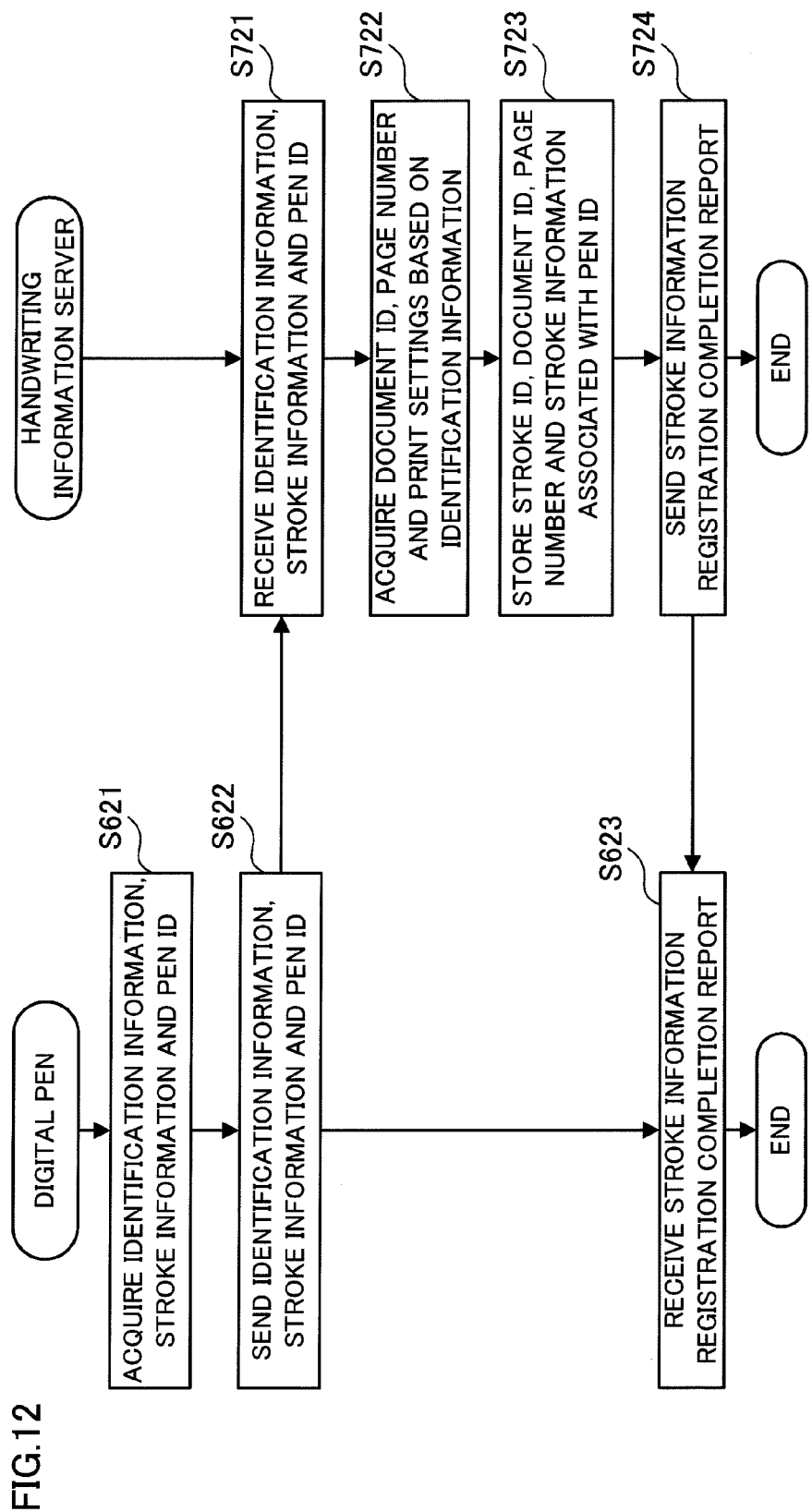
FIG. 12 is a sequence chart showing an operational example of the exemplary embodiment on the occasion of writing on the print document.

FIG. 12 is a sequence chart showing subsequent operations of the digital pen 60 and handwriting information server 70.

The digital pen 60 acquires the identification information, stroke information, and pen ID (Step 621). Specifically, the following process is performed. First, the code array generation portion 613 detects blocks from the dot array and generates a code array storing the code values of the respective blocks. The position of the synchronous code is then specified in the code array. Thereafter, the identification information acquisition portion 614 detects the identification codes on the basis of the position of the synchronous code, and decodes the detected identification codes to acquire the identification information. The positional information acquisition portion 615 detects the position codes on the basis of the position of the synchronous code and decodes the detected position codes to acquire the positional information. The stroke generation portion 616 connects the pieces of positional information for each stroke to generate the stroke information. Furthermore, in the present exemplary embodiment, the pen ID acquisition portion 617 acquires the pen ID from the pen ID memory 68 (see FIG. 10).

The communication controller 619 transfers the identification information, stroke information, and pen ID to the communication circuit 66. The communication circuit 66 then sends them to the handwriting information server 70 through the communication apparatus 55 and terminal apparatus 50 (Step 622).

In the handwriting information server 70, first, the receiver 71 receives the identification information, stroke information, and pen ID and transfers them to the stroke management unit 72 (Step 721).

Next, based on the transferred identification information, the stroke management unit 72 acquires the document ID of the electronic document printed on the medium, the page number of the printed page, and the print settings set when the electronic document is printed on the medium (Step 722). Specifically, first, the stroke management unit 72 transfers the identification information to the transmitter 79. The transmitter 79 then sends the identification information to the identification information server 30 to request for transmission of the document ID, page number, and print settings. The identification information server 30 thus sends the document ID, page number, and print settings. Accordingly, in the handwriting information server 70, the receiver 71 receives the document ID, page number, and print settings, and the stroke management unit 72 acquires them.

The stroke management unit 72 associates the pen ID with the stroke ID, document ID, page number, and stroke information, and stores them in the stroke management information storage unit 73 (Step 723). At this time, the stroke information indicating the positions on the medium and received from the digital pen 60 may be converted to the stroke information indicating the positions in the electronic document by using the print settings acquired in Step 722, and the converted stroke information may be stored.

Thereafter, the stroke information registration completion report is transferred from the stroke management unit 72 to the transmitter 79. The transmitter 79 then sends the digital pen 60 the stroke information registration completion report through the terminal apparatus 50 and communication apparatus 55 (Step 724).

In the digital pen 60, the communication circuit 66 receives the stroke information registration completion report, and the communication controller 619 receives the report from the communication circuit 66 (Step 623).

FIG. 13 is a table showing a specific example of the stroke management information.

As shown in the figure, the stroke management information is information in which the stroke ID, document ID, and page number, and stroke information are associated with each other.

The stroke ID is information for uniquely identifying each stroke as previously described.

The document ID is information for uniquely identifying each electronic document as previously described.

The page number is a numeral, for example, indicating a page of the electronic document as previously described.

The stroke information is information of each stroke on a medium which is converted into an electronic form, as described above. Here, the stroke information is stored not as image data but as a set of coordinates of positions on a medium where the pen tip has passed. However, it may be configured that the stroke information is stored as image data and only the coordinates of the starting point is stored.

The table shows that a stroke with a stroke ID of "SA101" is a stroke on the first page of an electronic document with a document ID of "DocA," and passes through points in the electronic document which are expressed by (XA111, YA111), (XA112, YA112), (XA113, YA113) . . . , respectively.

[Assignment of Stroke to Writing Frame]

In a case where writing in writing frames of a print document (a handwriting sheet form, for example) is to be recognized as characters and processed as text data, it is necessary to assign the aforementioned strokes to each of the writing frames.

However, if a part of a written character protrudes from the writing frame, it is difficult to assign the character to the correct writing frame. This is because assignment of characters to writing frames is normally performed on the stroke-by-stroke basis. Even when most of a character is within a writing frame, if a part of a stroke constituting the character protrudes from the writing frame, the stroke is not assigned to the same writing frame. Such case tends to be significant in Japanese and Chinese in which one character is composed of plural strokes.

Accordingly, use of commercially-available character recognition engines has a lot of restrictions.

Firstly, characters need to be written so as not to protrude from a writing frame. However, it is not practical to force users to write in such a manner.

Secondly, writing frames need to be made large. However, this will degrade the flexibility in form design.

In the present exemplary embodiment, the assignment of a stroke to a writing frame is performed not on the stroke-by-stroke basis but on the group-by-group basis in which each of groups is composed of plural strokes.

Figure 14A:
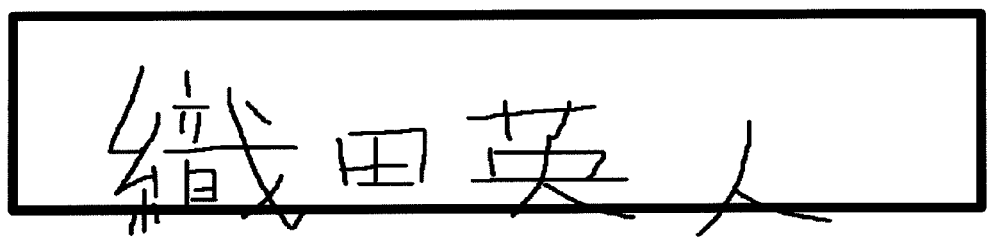
FIGS. 14A and 14B are views for illustrating an outline of operations of the assignment unit of the handwriting information server according to the exemplary embodiment.
Figure 14B:
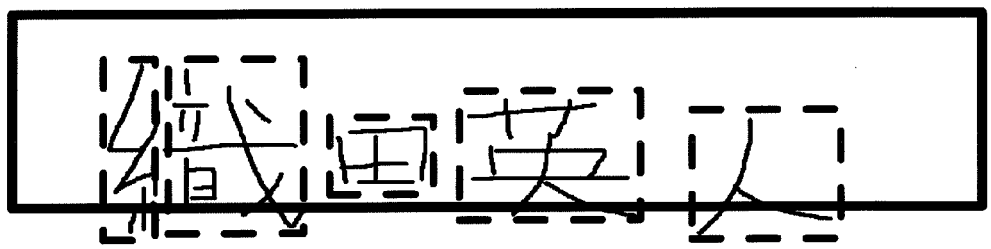

FIGS. 14A and 14B are views showing the outline of such an operation.

FIG. 14A shows an example of writing in a writing frame. In this example, the name is written in a lower part of a writing frame indicated by a bold solid line and partially protrudes from the writing frame. In this case, if the characters are assigned to the writing frame on the stroke-by-stroke basis, some strokes in a lower part of radical silk (left part) of a character 1 shown as below are not assigned to the writing frame since they are positioned outside the writing frame.

[Character 1] 織

On the other hand, FIG. 14B shows an example in which plural strokes constitute one group. Bold dashed lines indicate how groups are sectioned. In this case, the radical silk of the character 1 is assigned to a writing frame as one group, and some strokes in a lower part of the radical silk are assigned to the writing frame although they are positioned outside the writing frame. Since the grouping is performed for assignment to writing frames, the grouping may be performed such that one character is composed of two or more groups, as in the case of the character 1.

The aforementioned assignment of the stroke to the writing frame is performed by the assignment unit 76 of the handwriting information server 70. The overall configuration of the handwriting information server 70 is described above with reference to FIG. 4, and thus only the configuration of the assignment unit 76 is described herein.

Figure 15:
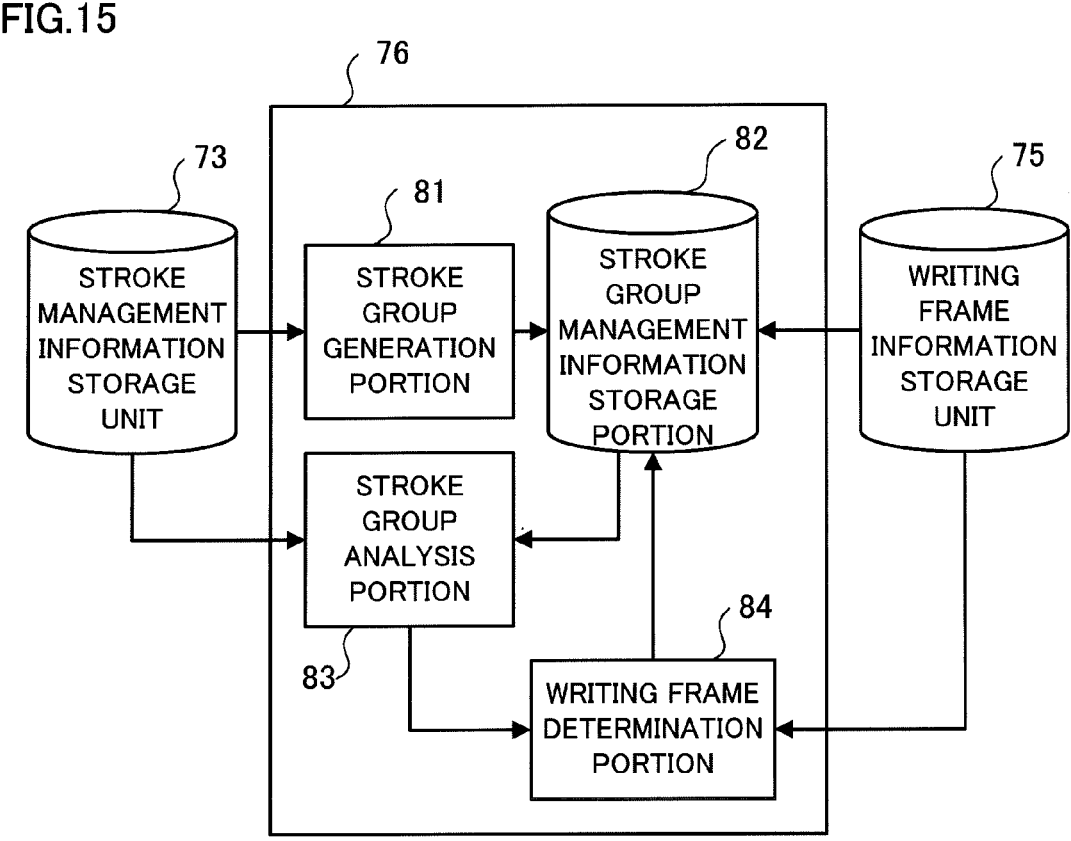
FIG. 15 is a block diagram showing a functional configuration example of the assignment unit of the handwriting information server according to the exemplary embodiment.

FIG. 15 is a block diagram showing a functional configuration example of the assignment unit 76.

As shown in the figure, the assignment unit 76 includes a stroke group generation portion 81, a stroke group management information storage portion 82, a stroke group analysis portion 83, and a writing frame determination portion 84. The figure also shows the stroke management information storage unit 73 and writing frame information storage unit 75, which are not constituent elements of the assignment unit 76.

The stroke group generation portion 81 groups plural pieces of stroke information stored in the stroke management information storage unit 73 to generate a stroke group. Stroke group management information is then stored in the stroke group management information storage portion 82. In the stroke group management information, identification information of each stroke group (hereinafter, referred to as stroke group ID) and the stroke IDs for identifying the respective strokes included in the stroke group are associated with each other. Here, the pieces of stroke information are grouped by using a chronological sequence or the positional relation of the strokes. For example, in the case of horizontal writing, strokes are classified into different groups when the transition from one stroke to the next stroke is made in a diagonally upward direction and the distance between these strokes is longer than a predetermined distance. However, the method of grouping the stroke information is not limited to this and may be another known method. In the present exemplary embodiment, each stroke group is used as an example of a trace information group, and the stroke group generation portion 81 is provided as an example of a generation unit that generates the trace information groups.

The stroke group management information storage portion 82 stores the stroke group management information generated by the stroke group generation portion 81.

The stroke group analysis portion 83 analyses each of the stroke groups and calculates a characteristic value related to the position of the stroke group (hereinafter, referred to as a stroke group characteristic value). Here, any of the following values is conceivable as the stroke group characteristic value: a value indicating the position of the barycenter of the stroke group, a value indicating the position of a circumscribed rectangle of the stroke group, a value indicating the positions of points constituting the stroke group, and the like. In the present exemplary embodiment, the stroke group characteristic value is used as an example of characteristic information on the position of each trace information group in an electronic document, and the stroke group analysis portion 83 is provided as an example of a character information acquisition unit that acquires the characteristic information.

The writing frame determination portion 84 compares the stroke group characteristic value obtained from the analysis performed by the stroke group analysis portion 83 with the coordinate information of the writing frames stored in the writing frame information storage unit 75 to determine a writing frame to which the stroke group is to be assigned. Then, a writing frame ID identifying the determined writing frame is associated with a stroke group ID identifying the stroke group, and stored in the stroke group management information storage portion 82. In the present exemplary embodiment, the writing frame determination portion 84 is provided as an example of a determination unit that determines one element used to associate the trace information group.

Next, a description is given of an operation performed when the assignment unit 76 of the handwriting information server 70 assigns a stroke to a writing frame. The process of assignment may be executed continuously after the stroke information is stored or may be executed at a predetermined time after the stroke information is stored.

In the assignment unit 76, first, the stroke group generation portion 81 groups the pieces of stroke information included in the stroke management information stored in the stroke management information storage unit 73 to generate a stroke group.

Figure 16:
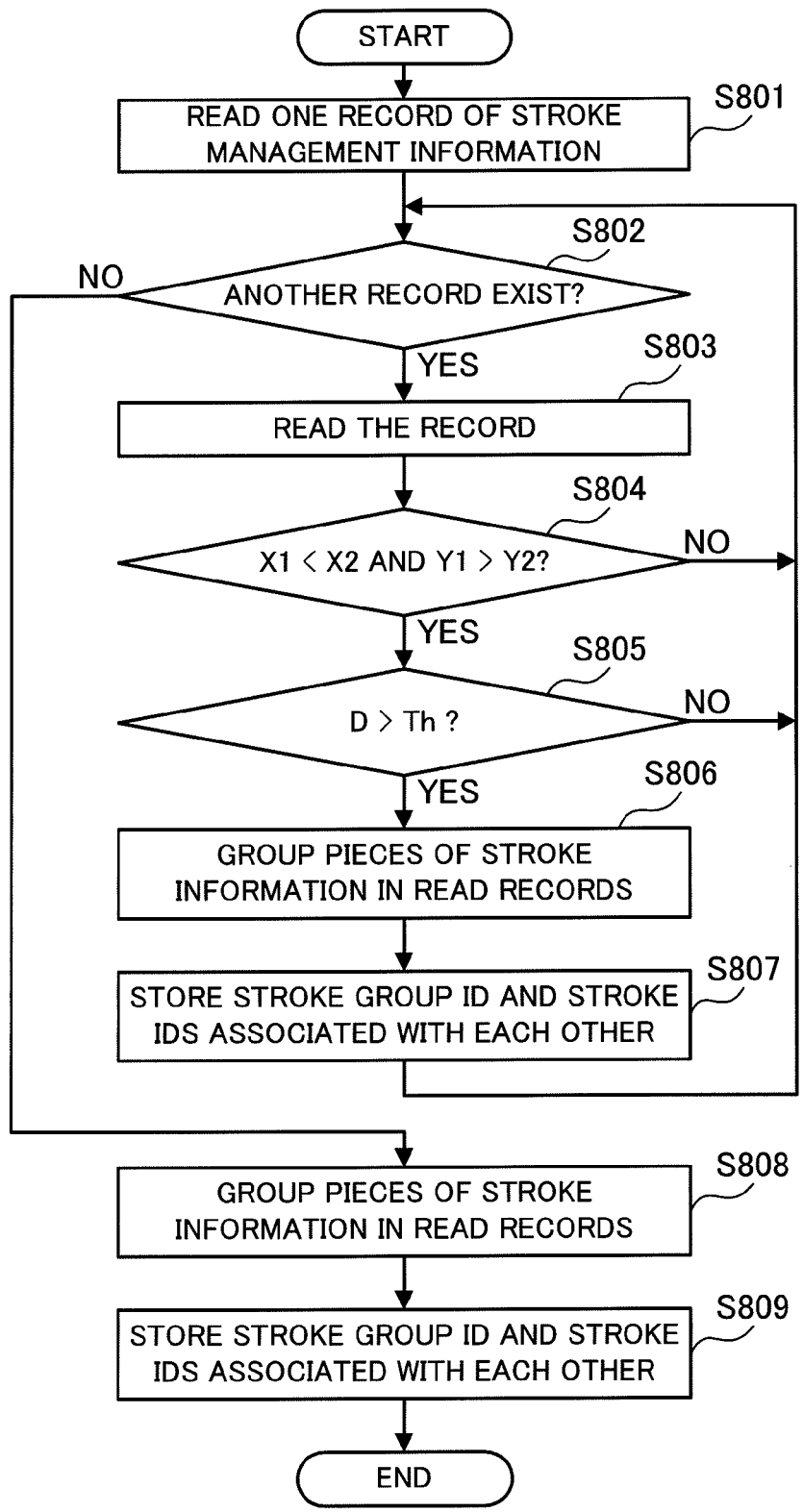
FIG. 16 is a flowchart showing an operational example of the stroke group generation portion of the handwriting information server according to the exemplary embodiment.

FIG. 16 is a flowchart showing an operational example of the stroke group generation portion 81 when the grouping is performed. In the operational example, it is assumed that strokes are classified into different groups when the transition from one stroke to the next stroke is made in the diagonally upward direction and the distance between these strokes is longer than the predetermined determined distance.

The stroke group generation portion 81 first reads one record of the stroke management information stored in the stroke management information storage unit 73 (Step 801), and then judges whether there is another record (Step 802). If there is another record, the stroke group generation portion 81 reads the record (Step 803).

The stroke group generation portion 81 judges whether an X coordinate X2 of a start point of a stroke in the latest read record is larger than an X coordinate X1 of an end point of a stroke in the previously read record and a Y coordinate Y2 of the start point of the stroke in the latest read record is smaller than a Y coordinate Y1 of the end point of the stroke in the previously read record (Step 804). In this specification, such a judgment is performed since the positive directions of the X axis and Y axis are the rightward and downward directions, respectively, and there is performed an examination on whether the transition from one stroke to the next stroke is made in the diagonally upward direction.

If it is judged that the X coordinate X2 is larger than the X coordinate X1 and the Y coordinate Y2 is smaller than the Y coordinate Y1, the stroke group generation portion 81 judges whether a distance D between the end point of the stroke in the previously read record and the start point of the stroke in the latest read record is larger than a predetermined threshold Th (Step 805).

If it is not judged in Step 804 that the X coordinate X2 is larger than the X coordinate X1 and the Y coordinate Y2 is smaller than the Y coordinate Y1 or if it is not judged in Step 805 that the distance D is larger than the threshold Th, the process returns to Step 802. Specifically, the stroke group generation portion 81 judges whether there is another record (Step 802). If there is another record, the stroke group generation portion 81 reads the record (Step 803) and judges again whether the X coordinate X2 is larger than the X coordinate X1 and the Y coordinate Y2 is smaller than the Y coordinate Y1, and whether the distance D is larger than the threshold Th (Steps 804 and 805).

The stroke group generation portion 81 repeats such reading of records until it is judged that the X coordinate X2 is larger than the X coordinate X1 and the Y coordinate Y2 is smaller than the Y coordinate Y1 and that the distance D is larger than the threshold Th. If it is judged that the X coordinate X2 is larger than the X coordinate X1 and the Y coordinate Y2 is smaller than the Y coordinate Y1 and that the distance D is larger than the threshold Th, the stroke group generation portion 81 groups the pieces of stroke information in records from the firstly read record or from the firstly read record after previous grouping to the latest read record, and generates a stroke group (Step 806).

The stroke group generation portion 81 stores the stroke group management information in which the stroke group ID and stroke IDs are associated with each other, in the stroke group management information storage portion 82 (Step 807). The stroke group IDs are information for uniquely identifying the stroke groups and are each assigned to a stroke group when the stroke group generation portion 81 stores the stroke group management information. As for the stroke IDs, the stroke IDs in the grouped records are stored.

In Step 802, there is no stroke to be processed when it is judged that there is no other record. Thus, the pieces of stroke information in records from the firstly read record or from the firstly read record after previous grouping to the latest read record is grouped and thus a stroke group is generated (Step 808).

The stroke group generation portion 81 then stores the stroke group management information in which the stroke group ID and stroke IDs are associated with each other, in the stroke group management information storage portion 82 (Step 809). The ways of acquiring the stroke group ID and stroke IDs are already described, and the detailed description thereof is thus omitted.

FIG. 17 is a table showing a specific example of the stroke group management information.

As shown in the table, the stroke group management information is information in which the stroke group ID, stroke IDs, and writing frame ID are associated with each other.

The stroke group ID is information for uniquely identifying the stroke group as previously described.

The stroke IDs are stroke IDs of the strokes constituting the stroke group.

The writing frame ID is information for identifying a writing frame to which the corresponding stroke group is assigned.

In the table, for example, a stroke group with a stroke group ID of "GA11" is a stroke group formed by grouping strokes with stroke IDs of "SA101," "SA102," "SA103," and the like. Note that, the writing frame ID is left blank because the assignment to the writing frame is not performed yet.

In the assignment unit 76, the stroke group analysis portion 83 and writing frame determination portion 84 assign each stroke group to a corresponding writing frame on the basis of the result of comparison between the position of the stroke group and the position of the writing frame. Here, the stroke group characteristic value being a value related to the position of the stroke group is used as the information indicating the position of the stroke group. As described above, the stroke group characteristic value may be a value indicating the position of the barycenter of the stroke group, a value indicating the position of a circumscribed rectangle of the stroke group, or a value indicating the positions of points constituting the stroke group. The operational examples using the above values are described as first, second, and third operational examples, respectively.

Figure 18:
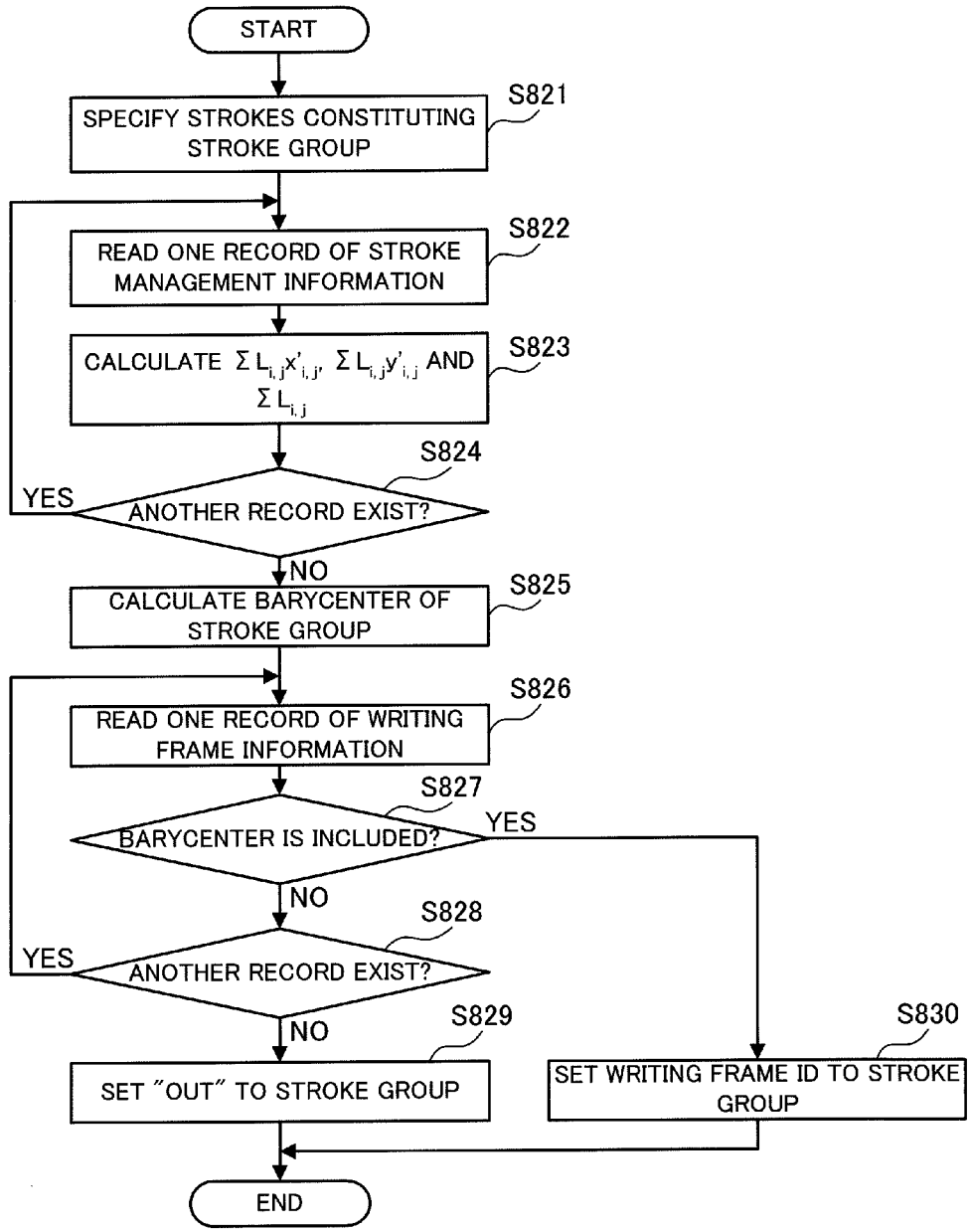
FIG. 18 is a flowchart showing a first operational example of the stroke group analysis portion and the writing frame determination portion of the handwriting information server according to the exemplary embodiment.

FIG. 18 is a flowchart showing a first operational example of the stroke group analysis portion 83 and the writing frame determination portion 84.

In the first operational example, the position of the barycenter of the stroke group is calculated as follows. Here, the number of strokes constituting the stroke group is S. The numbers of points on the respective strokes constituting the stroke group are considered as being the same for convenience, and are N. The coordinates of a j-th point $P_{i,j}$ on the i-th stroke is ($x_{i,j}$, $y_{i,j}$) (i=1, 2, 3, . . . , S, j=1, 2, 3, . . . , N). Points whose positional information is acquired by the digital pen 60 may be used as the points on the stroke. However, points selected according to a predetermined rule may be used in a case where the stroke information is sent as image data and the like.

In order to calculate the position of the barycenter of the stroke group, first, a distance $L_{i,j}$ between a point $P_{i,j}$ and point $P_{i,j+1}$ is calculated from the following formula (i=1, 2, 3, ..., S, j=1, 2, 3, ..., N−1).

$$L_{i,j} = \sqrt{(x_{i,j+1} - x_{i,j})^2 + (y_{i,j+1} - y_{i,j})^2}$$ [Formula 1]

Secondly, coordinates $(x'_{i,j}, y'_{i,j})$ of a middle point $M_{i,j}$ between the point $P_{i,j}$ and point $P_{i,j+1}$ is calculated from the following formula (i=1, 2, 3, ..., S, j=1, 2, 3, ..., N−1).

$$M_{i,j} = (x'_{i,j}, y'_{i,j}) = \left(\frac{x_{i,j} + x_{i,j+1}}{2}, \frac{y_{i,j} + y_{i,j+1}}{2}\right)$$ [Formula 2]

Thirdly, coordinates $(X_G, Y_G)$ of a barycenter G of the stroke group is calculated from the following formula.

$$G = (X_G, Y_G) = \left(\frac{\sum_{i=1}^{S}\sum_{j=1}^{N-1} L_{i,j} x'_{i,j}}{\sum_{i=1}^{S}\sum_{j=1}^{N-1} L_{i,j}}, \frac{\sum_{i=1}^{S}\sum_{j=1}^{N-1} L_{i,j} y'_{i,j}}{\sum_{i=1}^{S}\sum_{j=1}^{N-1} L_{i,j}}\right)$$ [Formula 3]

Hereinafter, a description is given of the operation for assigning a stroke group to the writing frame.

The stroke group analysis portion 83 first specifies one or more strokes constituting the stroke group to be processed, while referring to the stroke group management information stored in the stroke group management information storage portion 82 (Step 821). Specifically, the stroke group management information is searched using the stroke group ID as a search key, and one or more stroke IDs are acquired.

Next, the stroke group analysis portion 83 reads one record corresponding to one stroke among the one or more strokes specified in Step 821, from the stroke management information stored in the stroke management information storage unit 73 (Step 822). Specifically, one record including one stroke ID among the one or more stroke IDs acquired in Step 821 is read from the stroke management information.

The stroke group analysis portion 83 uses the stroke information in the record read in Step 822 to calculate $\Sigma L_{i,j} x'_{i,j}$, $\Sigma L_{i,j} y'_{i,j}$, and $\Sigma L_{i,j}$ (Step 823). In this case, $\Sigma$ is a total sum where j=1, 2, 3, ..., N−1.

Thereafter, the stroke group analysis portion 83 judges whether the stroke management information storage unit 73 includes another record (Step 824). If the stroke management information storage unit 73 includes another record, the processes of Steps 822 and 823 are repeated. If the stroke management information storage unit 73 includes no other record, the process proceeds to Step 825.

The stroke group analysis portion 83 then calculates the coordinates of the barycenter of the stroke group to be processed (Step 825). Here, an X coordinate $X_G$ of the barycenter may be calculated by dividing a value obtained from the addition of $\Sigma L_{i,j} x'_{i,j}$ for all the strokes by a value obtained from the addition of $\Sigma L_{i,j}$ for all the strokes. Moreover, a Y coordinate $Y_G$ of the barycenter may be calculated by dividing a value obtained from the addition of $\Sigma L_{i,j} y'_{i,j}$ for all the strokes by a value obtained from the addition of $\Sigma L_{i,j}$ for all the strokes.

Subsequently, the writing frame determination portion 84 reads one record from the writing frame information stored in the writing frame information storage unit 75 (Step 826).

The writing frame determination portion 84 judges whether the writing frame defined by the coordinate information in the read record includes the barycenter calculated in Step 825 (Step 827). In the case where the first record in the writing frame information is read, for example, this judgment may be performed by examining whether the X coordinate $X_G$ of the barycenter satisfies $LA11 \leq X_G \leq RA11$ and the Y coordinate $Y_G$ of the barycenter satisfies $TA11 \leq Y_G \leq BA11$.

If it is judged that the writing frame does not include the barycenter, the writing frame determination portion 84 judges whether the writing frame information storage unit 75 includes another record (Step 828). If the writing frame information storage unit 75 includes another record, the processes in Steps 826 and 827 are repeated. If the writing frame information storage unit 75 include no other record, "OUT" indicating that the stroke group is not assigned to any writing frame is stored in a field of the writing frame ID corresponding to the stroke group ID of the stroke group which is to be processed and which is stored in the stroke group management information storage portion 82 (Step 829).

On the other hand, if it is judged that the writing frame includes the barycenter in Step 827, the writing frame determination portion 84 stores the writing frame ID in the record read in Step 826, for the stroke group ID of the stroke group which is to be processed and which is stored in the stroke group management information storage portion 82 (Step 830).

Figure 19:
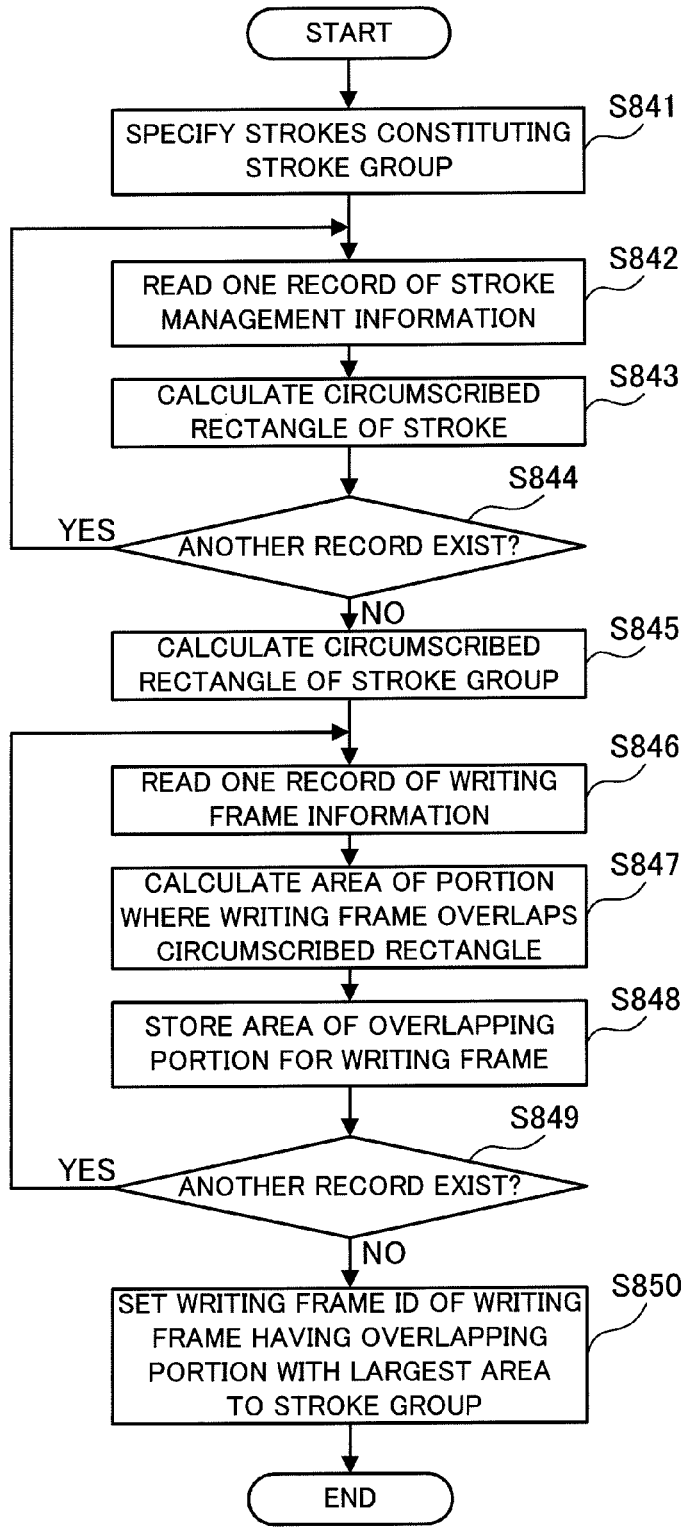
FIG. 19 is a flowchart showing a second operational example of the stroke group analysis portion and the writing frame determination portion of the handwriting information server according to the exemplary embodiment.

FIG. 19 is a flowchart showing a second operational example of the stroke group analysis portion 83 and the writing frame determination portion 84. Also in the second operational example, the coordinates of a j-th point $P_{i,j}$ on the i-th stroke are $(x_{i,j}, y_{i,j})$ (i=1, 2, 3, ..., j=1, 2, 3, ..., N). A description is given of a case of assigning a certain stroke group to a writing frame.

The stroke group analysis portion 83 first specifies one or more strokes constituting the stroke group to be processed, while referring to the stroke group management information stored in the stroke group management information storage portion 82 (Step 841). Specifically, the stroke group management information is searched using the stroke group ID as a search key, and one or more stroke IDs are acquired.

Next, the stroke group analysis portion 83 reads one record corresponding to one stroke among the one or more strokes specified in Step 841, from the stroke management information stored in the stroke management information storage unit 73 (Step 842). Specifically, one record including one stroke ID among the one or more stroke IDs acquired in Step 841 is read from the stroke management information.

The stroke group analysis portion 83 uses the stroke information in the record read in Step 842 to calculate a circumscribed rectangle of the stroke (Step 843). Here, the circumscribed rectangle of the stroke may be a rectangle whose X coordinate of the left end is equal to the smallest value of $x_{i,j}$ in the stroke, whose X coordinate of the right end is equal to the largest value of $x_{i,j}$ in the stroke, whose the Y coordinate of the top end is equal to the smallest value of $y_{i,j}$ in the stroke, and whose Y coordinate of the bottom end is equal to the largest value of $y_{i,j}$ in the stroke.

Thereafter, the stroke group analysis portion 83 judges whether the stroke management information storage unit 73 includes another record (Step 844). If the stroke management information storage unit 73 includes another record, the processes of Step 842 to 843 are repeated. If the stroke management information storage unit 73 includes no other record, the process proceeds to Step 845.

The stroke group analysis portion 83 calculates a circumscribed rectangle of the stroke group to be processed (Step 845). The circumscribed rectangle of the stroke group may be a rectangle whose X coordinate of the left end is equal to the smallest value among X coordinates of the left ends of all the strokes, whose X coordinate of the right end is equal to the largest value among X coordinates of the right ends of all the strokes, whose Y coordinate of the top end is equal to the smallest value among Y coordinates of the top ends of all the strokes, and whose Y coordinate of the bottom end is equal to the largest value among Y coordinates of the bottom ends of all the strokes.

Subsequently, the writing frame determination portion 84 reads one record from the writing frame information stored in the writing frame information storage unit 75 (Step 846).

The writing frame determination portion 84 calculates an area of a portion where the writing frame defined by the coordinate information in the read record overlaps the circumscribed rectangle calculated in Step 845 (Step 847). The area of the overlapping portion may be calculated by a publicly known mathematical method, and the detailed description of the calculation method is thus omitted.

The writing frame determination portion 84 associates the writing frame ID in the record read in Step 846 with the area of the overlapping portion calculated in Step 847, and stores them in the memory (Step 848).

The writing frame determination portion 84 then judges whether the writing frame information storage unit 75 includes another record (Step 849). If the writing frame information storage unit 75 includes another record, the processes of Steps 846 to 848 are repeated. If the writing frame information storage unit 75 include no other record, the writing frame ID of the writing frame having the overlapping portion with the largest area is stored for the stroke group ID of the stroke group to be processed which is stored in the stroke group management information storage portion 82 (Step 850). Specifically, the overlapping portion with the largest area is specified among the overlapping portions stored in the memory, and the writing frame ID associated with the specified overlapping portion is stored.

In this operational example, the stroke group is assigned to the writing frame having the overlapping portion with the largest area by comparing the overlapping portions in the respective writing frames. However, the assignment method is not limited to this. For example, if the area of the overlapping portion in a certain writing frame satisfies a predetermined condition, the stroke group may be assigned to this writing frame. Here, the predetermined condition may be a condition that the area of the overlapping portion is 50% or more of the area of the circumscribed rectangle, or the like.

Moreover, the characteristic value related to the circumscribed rectangle of the stroke group is used as the stroke group characteristic value in this operational example. However, the stroke group characteristic value is not limited to this, and may be any characteristic value which is recognizable as a characteristic value related to a circumscribed figure such as a circumscribed circle or a circumscribed polygon other than a rectangle.

Figure 20:
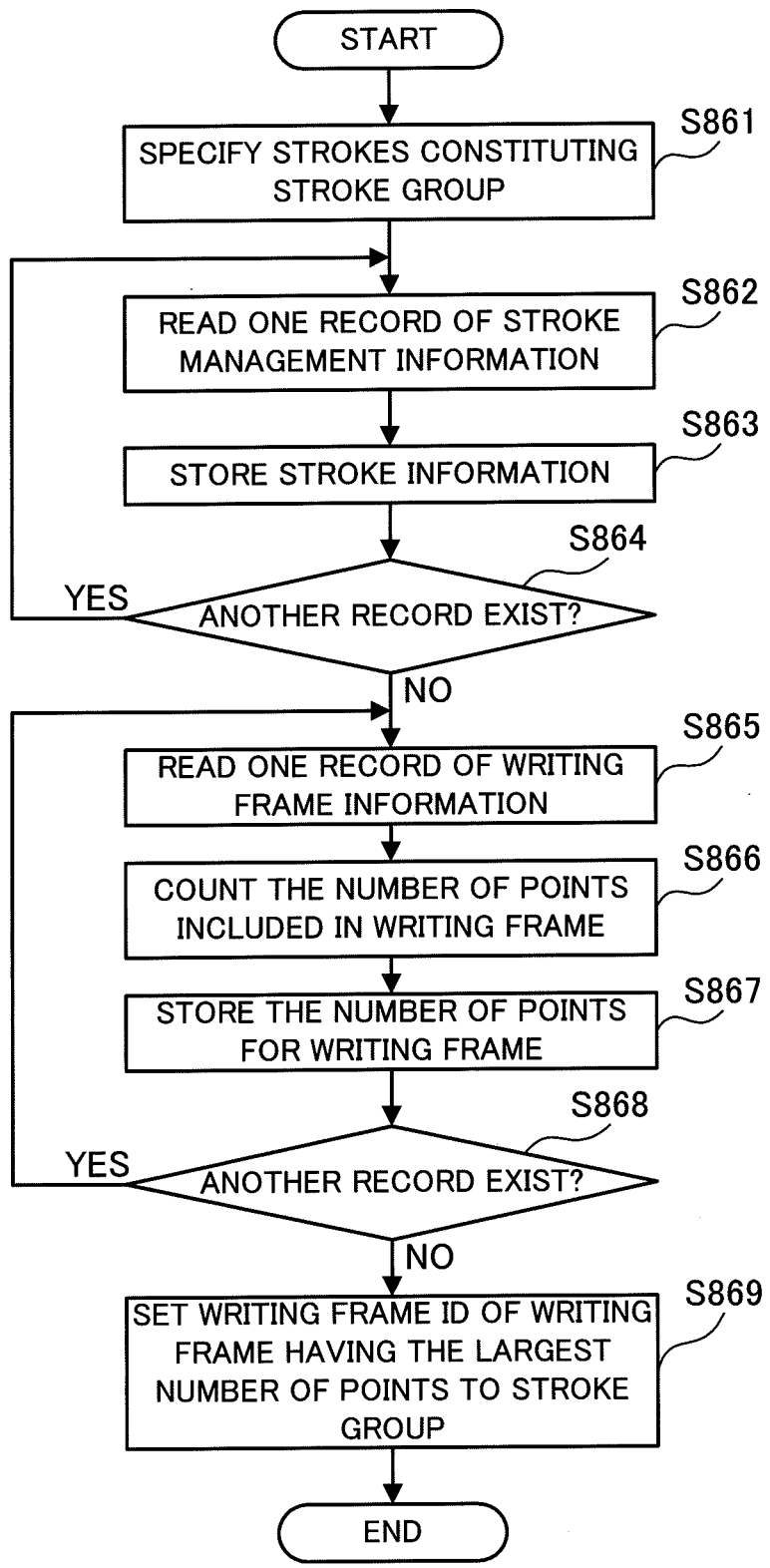
FIG. 20 is a flowchart showing a third operational example of the stroke group analysis portion and the writing frame determination portion of the handwriting information server according to the exemplary embodiment.

FIG. 20 is a flowchart showing a third operational example of the stroke group analysis portion 83 and the writing frame determination portion 84. A description is given of the case of assigning a certain stroke group to a writing frame, also in the third operational example.

The stroke group analysis portion 83 first specifies one or more strokes constituting the stroke group to be processed, while referring to the stroke group management information stored in the stroke group management information storage portion 82 (Step 861). Specifically, the stroke group management information is searched using the stroke group ID as a search key, and one or more stroke IDs are acquired.

Next, the stroke group analysis portion 83 reads one record corresponding to one stroke among the one or more strokes specified in Step 861, from the stroke management information stored in the stroke management information storage unit 73 (Step 862). Specifically, one record including one stroke ID among the one or more stroke IDs acquired in Step 861 is read from the stroke management information.

The stroke group analysis portion 83 stores, in a memory, the stroke information in the record read in Step 862, i.e. positions of points on the stroke (Step 863).

Thereafter, the stroke group analysis portion 83 judges whether the stroke management information storage unit 73 includes another record (Step 864). If the stroke management information storage unit 73 includes another record, the processes of Steps 862 and 863 are repeated. If the stroke management information storage unit 73 includes no other record, the operation proceeds to Step 865.

Subsequently, the writing frame determination portion 84 reads one record from the writing frame information stored in the writing frame information storage unit 75 (Step 865).

The writing frame determination portion 84 examines how many points among the points stored in the memory in Step 863 are included in the writing frame defined by the coordinate information in the read record, and counts the number of points included in the writing frame (Step 866).

The writing frame determination portion 84 associates the writing frame ID in the record read in Step 865 with the number of points counted in Step 866, and stores them in a memory (Step 867).

The writing frame determination portion 84 then judges whether the writing frame information storage unit 75 includes another record (Step 868). If the writing frame information storage unit 75 includes another record, the processes of Steps 865 to 867 are repeated. If the writing frame information storage unit 75 includes no other record, the writing frame ID of the writing frame having the largest number of points is stored for the stroke group ID of the stroke group to be processed which is stored in the stroke group management information storage portion 82 (Step 869). Specifically, the largest number of points is specified among the numbers of points stored in the memory, and the writing frame ID associated with the specified number of points is stored.

In this operational example, the stroke group is assigned to the writing frame having the largest number of points by comparing the numbers of points included in the respective writing frames. However, the assignment method is not limited to this. For example, if the number of points included in a certain writing frame satisfies a predetermined condition, the stroke group may be assigned to this writing frame. Here, the predetermined condition may be a condition that the number of points included in the writing frame is 50% or more of the number of points included in the stroke group, or the like.

In the present exemplary embodiment, the information indicating positions on an electronic document is stored as the coordinate information of FIG. 9 and the stroke information of FIG. 13. However, information indicating positions on a medium may be stored. Specifically, operations as follows may be performed. In FIG. 8, the identification information and print settings are acquired in Step 741 in addition to the document ID, and the coordinate information is converted based on the print settings in Step 745. In Step 747, the identification information is stored instead of the document ID and page number, and the converted coordinate information is stored as the coordinate information. In FIG. 12, Step 722 is not executed. In Step 723, the identification information is stored instead of the document ID and page number, and the stroke information before conversion based on the print settings is stored as the stroke information. The comparison between the position of the writing frame and the characteristic value of the stroke group which is performed in each of Step 827 in FIG. 18, Step 847 in FIG. 19, and Step 866 in FIG. 20 may be performed using a position on a medium instead of the position on the electronic document.

In this case, the electronic document analysis unit 74 is provided as an example of the positional information acquisition unit that acquires plural pieces of positional information respectively indicating positions where plural elements are printed on the medium. Moreover, the stroke group characteristic value is used as an example of characteristic information on the position of the trace information group on the medium, and the stroke group analysis portion 83 is provided as an example of the characteristic information acquisition unit that acquires such characteristic information.

In the present exemplary embodiment, the digital pen 60 generates the stroke information, and the handwriting information server 70 manages the stroke information and assigns the stroke information to the writing frame. However, various variations are conceivable for apparatuses used to perform these processes. For example, the stroke information may be generated by the terminal apparatus 50 or handwriting information server 70 on the basis of the positional information sent from the digital pen 60. Moreover, the stroke information may be managed by the terminal apparatus 50.

Assuming that the above processes are performed using a computer 90, a description is given of a hardware configuration of the computer 90.

Figure 21:
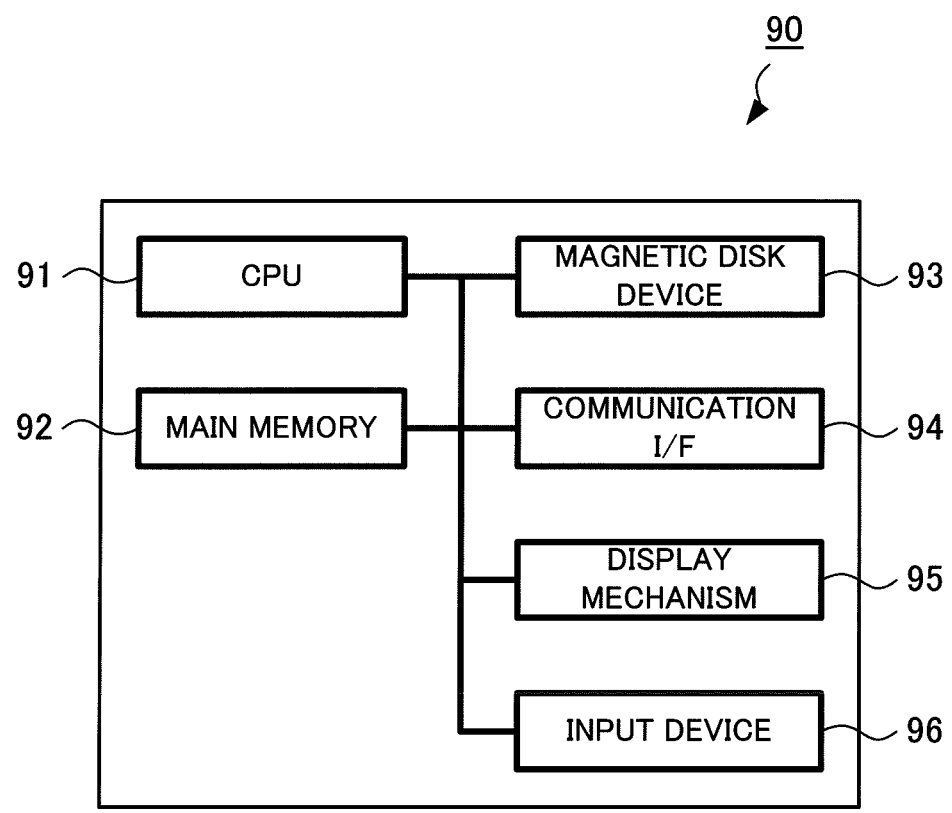
FIG. 21 is a diagram of a hardware configuration example of a computer that is capable of implementing the exemplary embodiment.

FIG. 21 is a diagram showing a hardware configuration of the computer 90.

As shown in the drawing, the computer 90 includes a central processing unit (CPU) 91 being a computing unit, and includes a main memory 92 and a magnetic disk device (HDD: hard disk drive) 93 being storage units. Here, the CPU 91 executes various types of software such as an operating system (OS) and applications to implement the above-described processing units. Moreover, the main memory 92 stores various types of software, data used to execute the software, and the like. The magnetic disk device 93 stores data to be inputted to the various types of software, data outputted from the various types of software, and the like. The above-described storage units are implemented by at least one of the main memory 92 and magnetic disk device 93.

Furthermore, the computer 90 includes a communication I/F 94 for external communication, a display mechanism 95 composed of a video memory, a display, and the like, and an input device 96 such as a key board and a mouse.

A program to implement the present exemplary embodiment may be provided through a communication system as a matter of course, and may also be provided by being stored in a recording medium such as a CD-ROM.

The foregoing description of the present exemplary embodiments of the present invention has been provided for the purposes of illustration and description. It is not intended to be exhaustive or to limit the invention to the precise forms disclosed. Obviously, many modifications and variations will be apparent to practitioners skilled in the art. The present exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A trace information processing apparatus comprising:
a positional information acquisition unit that acquires a plurality of pieces of positional information respectively indicating positions where a plurality of writing frames constituting an electronic document are located in the electronic document, where each of the plurality of the writing frames is associated with two or more of the acquired pieces of positional information;
a trace information acquisition unit that acquires a plurality of pieces of trace information respectively indicating a plurality of traces by an electronic writing tool on a medium while the electronic writing tool is in contact with the medium, wherein each of the plurality of traces corresponds to an individual stroke by the electronic writing tool, the electronic document is printed on the medium, and the medium comprises the writing frames;
a generation unit that generates a trace information group by grouping the plurality of pieces of trace information acquired by the trace information acquisition unit;
a characteristic information acquisition unit that acquires characteristic information on a position where the trace information group generated by the generation unit is located in the electronic document; and
a determination unit that determines one of the plurality of writing frames as one writing frame with which the trace information group is associated, on the basis of the plurality of pieces of positional information acquired by the positional information acquisition unit and the characteristic information acquired by the characteristic information acquisition unit.

2. The trace information processing apparatus according to claim 1, wherein
the characteristic information acquisition unit acquires the characteristic information on a figure circumscribing the trace information group generated by the generation unit, and
the determination unit determines the one writing frame by comparing areas occupied by the figure in the respective plurality of writing frames.

3. The trace information processing apparatus according to claim 2, wherein
the characteristic information acquisition unit acquires the characteristic information on points included in the trace information group generated by the generation unit, and
the determination unit determines the one writing frame by comparing the numbers of the points included in the respective plurality of writing frames.

4. The trace information processing apparatus according to claim 2, wherein
the characteristic information acquisition unit acquires the characteristic information on points included in the trace information group generated by the generation unit, and
when the number of the points included in a particular writing frame among the plurality of writing frames satisfies a predetermined condition, the determination unit determines the particular writing frame as the one writing frame.

5. The trace information processing apparatus according to claim 2, wherein
the characteristic information acquisition unit acquires the characteristic information on the barycenter of the trace information group generated by the generation unit, and
when the barycenter is included in a particular writing frame among the plurality of writing frames, the determination unit determines the particular writing frame as the one writing frame.

6. The trace information processing apparatus according to claim 1, wherein
the characteristic information acquisition unit acquires the characteristic information on a figure circumscribing the trace information group generated by the generation unit, and
when an area occupied by the figure in a particular writing frame among the plurality of writing frames satisfies a predetermined condition, the determination unit determines the particular writing frame as the one writing frame.

7. The trace information processing apparatus according to claim 6, wherein
the characteristic information acquisition unit acquires the characteristic information on points included in the trace information group generated by the generation unit, and
the determination unit determines the one writing frame by comparing the numbers of the points included in the respective plurality of writing frames.

8. The trace information processing apparatus according to claim 6, wherein
the characteristic information acquisition unit acquires the characteristic information on points included in the trace information group generated by the generation unit, and
when the number of the points included in a particular writing frame among the plurality of writing frames satisfies a predetermined condition, the determination unit determines the particular writing frame as the one writing frame.

9. The trace information processing apparatus according to claim 6, wherein
the characteristic information acquisition unit acquires the characteristic information on the barycenter of the trace information group generated by the generation unit, and
when the barycenter is included in a particular writing frame among the plurality of writing frames, the determination unit determines the particular writing frame as the one writing frame.

10. The trace information processing apparatus according to claim 1, wherein
the characteristic information acquisition unit acquires the characteristic information on points included in the trace information group generated by the generation unit, and
the determination unit determines the one writing frame by comparing the numbers of the points included in the respective plurality of writing frames.

11. The trace information processing apparatus according to claim 1, wherein
the characteristic information acquisition unit acquires the characteristic information on points included in the trace information group generated by the generation unit, and
when the number of the points included in a particular writing frame among the plurality of writing frames satisfies a predetermined condition, the determination unit determines the particular writing frame as the one writing frame.

12. The trace information processing apparatus according to claim 1, wherein the positional information acquisition unit that acquires (i) the plurality of pieces of positional information respectively indicating positions where the plurality of elements constituting the electronic document are located in the electronic group, (ii) a document identifier of the electronic document, (iii) respective element identifiers of the elements, and (iv) a page number of the electronic document if the electronic document includes more than one page.

13. A trace information processing apparatus comprising:
a positional information acquisition unit that acquires a plurality of pieces of positional information respectively indicating positions where a plurality of elements constituting an electronic document are located in the electronic document;
a trace information acquisition unit that acquires a plurality of pieces of trace information respectively indicating a plurality of traces on which an electronic writing tool has passed in an operation performed a plurality of times in which the electronic writing tool is moved on a medium having the electronic document printed thereon while the electronic writing tool is in contact with the medium;
a generation unit that generates a trace information group by grouping the plurality of pieces of trace information acquired by the trace information acquisition unit;
a characteristic information acquisition unit that acquires characteristic information on a position where the trace information group generated by the generation unit is located in the electronic document; and
a determination unit that determines one of the plurality of elements as one element with which the trace information group is associated, on the basis of the plurality of pieces of positional information acquired by the positional information acquisition unit and the characteristic information acquired by the characteristic information acquisition unit,
wherein the characteristic information acquisition unit acquires the characteristic information on the barycenter of the trace information group generated by the generation unit, and
when the barycenter is included in a particular element among the plurality of elements, the determination unit determines the particular element as the one element.

14. A trace information processing apparatus comprising:
a positional information acquisition unit that acquires a plurality of pieces of positional information respectively indicating positions where a plurality of writing frames constituting an electronic document are printed in a medium on which the electronic document is printed, the medium comprising the writing frames, where each of the plurality of the writing frames is associated with two or more of the acquired pieces of positional information;
a trace information acquisition unit that acquires a plurality of pieces of trace information respectively indicating a plurality of traces by an electronic writing tool on the medium while the electronic writing tool is in contact with the medium, wherein each of the plurality of traces corresponds to an individual stroke by the electronic writing tool;
a generation unit that generates a trace information group by grouping the plurality of pieces of trace information acquired by the trace information acquisition unit;
a characteristic information acquisition unit that acquires characteristic information on a position where the trace information group generated by the generation unit is located in the medium; and
a determination unit that determines one of the plurality of writing frames as one writing frame with which the trace information group is associated, on the basis of the plurality of pieces of positional information acquired by the positional information acquisition unit and the characteristic information acquired by the characteristic information acquisition unit.

15. A trace information processing system comprising:
a trace information generation apparatus that generates trace information indicating a traces by the trace information generation apparatus on a medium while being in contact with the medium, wherein each trace corresponds to an individual stroke by the trace information generation apparatus; and a trace information processing apparatus that processes the trace information generated by the trace information generation apparatus, wherein the trace information generation apparatus includes a transmitter that transmits a plurality of pieces of the trace information generated in the operation performed a plurality of times on the medium on which an electronic document is printed, and the trace information processing apparatus includes:
a positional information acquisition unit that acquires a plurality of pieces of positional information respectively indicating positions where a plurality of writing frames constituting the electronic document are located in the electronic document, where each of the plurality of the writing frames is associated with two or more of the acquired pieces of positional information;
a receiver that receives the plurality of pieces of trace information transmitted by the transmitter;
a generation unit that generates a trace information group by grouping the plurality of pieces of trace information received by the receiver;
a characteristic information acquisition unit that acquires characteristic information on a position where the trace information group generated by the generation unit is located in the electronic document; and
a determination unit that determines one of the plurality of writing frames as one writing frame with which the trace information group is associated, on the basis of the plurality of pieces of positional information acquired by the positional information acquisition unit and the characteristic information acquired by the characteristic information acquisition unit.

16. A trace information processing method comprising:
acquiring a plurality of pieces of positional information respectively indicating positions where a plurality of writing frames constituting an electronic document are located in the electronic document, where each of the plurality of the writing frames is associated with two or more of the acquired pieces of positional information;
acquiring a plurality of pieces of trace information respectively indicating a plurality of traces by an electronic writing tool on a medium while the electronic writing tool is in contact with the medium, wherein each of the plurality of traces corresponds to an individual stroke by the electronic writing tool, the electronic document is printed on the medium, and the medium comprises the writing frames;
generating a trace information group by grouping the plurality of pieces of trace information;
acquiring characteristic information on a position where the trace information group is located in the electronic document; and
determining one of the plurality of writing frames as one writing frame with which the trace information group is associated, on the basis of the plurality of pieces of positional information and the characteristic information.

17. A non-transitory computer readable medium storing a program that causes a computer to execute a process for trace information processing, the process comprising:

acquiring a plurality of pieces of positional information respectively indicating positions where a plurality of writing frames constituting an electronic document are located in the electronic document;
acquiring a plurality of pieces of trace information respectively indicating a plurality of traces by an electronic writing tool on a medium while the electronic writing tool is in contact with the medium, wherein each of the plurality of traces corresponds to an individual stroke by the electronic writing tool, the electronic document is printed on the medium, and the medium comprises the writing frames;
generating a trace information group by grouping the plurality of pieces of trace information;
acquiring characteristic information on a position where the trace information group is located in the electronic document; and
determining one of the plurality of writing frames as one writing frame with which the trace information group is associated, on the basis of the plurality of pieces of positional information and the characteristic information.

18. A trace information processing apparatus comprising:
a positional information acquisition unit that acquires a plurality of pieces of positional information respectively indicating positions where a plurality of elements constituting an electronic document are printed in a medium on which the electronic document is printed;
a trace information acquisition unit that acquires a plurality of pieces of trace information respectively indicating a plurality of traces on which an electronic writing tool has passed in an operation performed a plurality of times in which the electronic writing tool is moved on the medium while the electronic writing tool is in contact with the medium;
a generation unit that generates a trace information group by grouping the plurality of pieces of trace information acquired by the trace information acquisition unit;
a characteristic information acquisition unit that acquires characteristic information on a position where the trace information group generated by the generation unit is located in the medium; and
a determination unit that determines one of the plurality of elements as one element with which the trace information group is associated, on the basis of the plurality of pieces of positional information acquired by the positional information acquisition unit and the characteristic information acquired by the characteristic information acquisition unit,
wherein the characteristic information acquisition unit acquires the characteristic information on the barycenter of the trace information group generated by the generation unit, and
when the barycenter is included in a particular element among the plurality of elements, the determination unit determines the particular element as the one element.

19. A trace information processing system comprising:
a trace information generation apparatus that generates trace information indicating a traces on which the apparatus has passed in an operation in which the apparatus is moved on a medium while being in contact with the medium; and
a trace information processing apparatus that processes the trace information generated by the trace information generation apparatus, wherein
the trace information generation apparatus includes a transmitter that transmits a plurality of pieces of the trace information generated in the operation performed a plurality of times on the medium on which an electronic document is printed, and the trace information processing apparatus includes:
- a positional information acquisition unit that acquires a plurality of pieces of positional information respectively indicating positions where a plurality of elements constituting the electronic document are located in the electronic document;
- a receiver that receives the plurality of pieces of trace information transmitted by the transmitter;
- a generation unit that generates a trace information group by grouping the plurality of pieces of trace information received by the receiver;
- a characteristic information acquisition unit that acquires characteristic information on a position where the trace information group generated by the generation unit is located in the electronic document; and
- a determination unit that determines one of the plurality of elements as one element with which the trace information group is associated, on the basis of the plurality of pieces of positional information acquired by the positional information acquisition unit and the characteristic information acquired by the characteristic information acquisition unit, wherein the characteristic information acquisition unit acquires the characteristic information on the barycenter of the trace information group generated by the generation unit, and when the barycenter is included in a particular element among the plurality of elements, the determination unit determines the particular element as the one element.

20. A trace information processing method comprising:
acquiring a plurality of pieces of positional information respectively indicating positions where a plurality of elements constituting an electronic document are located in the electronic document;

acquiring a plurality of pieces of trace information respectively indicating a plurality of traces on which an electronic writing tool has passed in an operation performed a plurality of times in which the electronic writing tool is moved on a medium having the electronic document printed thereon while the electronic writing tool is in contact with the medium;

generating a trace information group by grouping the plurality of pieces of trace information;

acquiring characteristic information on a position where the trace information group is located in the electronic document; and determining one of the plurality of elements as one element with which the trace information group is associated, on the basis of the plurality of pieces of positional information and the characteristic information, wherein the acquiring the characteristic information comprises acquiring the characteristic information on the barycenter of the trace information group, and when the barycenter is included in a particular element among the plurality of elements, the determining comprises determining the particular element as the one element.

21. A non-transitory computer readable medium storing a program that causes a computer to execute a process for trace information processing, the process comprising:
acquiring a plurality of pieces of positional information respectively indicating positions where a plurality of elements constituting an electronic document are located in the electronic document;

acquiring a plurality of pieces of trace information respectively indicating a plurality of traces on which an electronic writing tool has passed in an operation performed a plurality of times in which the electronic writing tool is moved on a medium having the electronic document printed thereon while the electronic writing tool is in contact with the medium;

generating a trace information group by grouping the plurality of pieces of trace information;

acquiring characteristic information on a position where the trace information group is located in the electronic document; and determining one of the plurality of elements as one element with which the trace information group is associated, on the basis of the plurality of pieces of positional information and the characteristic information, wherein the acquiring the characteristic information comprises acquiring the characteristic information on the barycenter of the trace information group, and when the barycenter is included in a particular element among the plurality of elements, the determining comprises determining the particular element as the one element.

* * * * *